(12) United States Patent
Takeo et al.

(10) Patent No.: US 6,176,477 B1
(45) Date of Patent: Jan. 23, 2001

(54) LIQUID-SEALING TYPE VARIATION ISOLATING APPARATUS

(75) Inventors: Shigeki Takeo, Nagoya; Takashi Maeno, Aichi-ken; Masanao Gotou, Gifu-ken; Hiroshi Yokoi, Nagoya; Takeshi Naito, Okazaki; Tomoyuki Sawatari, Kakamigahara; Hisayoshi Kato, Toyota; Osamu Nakagaki, Ichinomiya, all of (JP)

(73) Assignee: Toyoda Gosei Co. LTd., Aichi-ken (JP)

( * ) Notice: Under 35 U.S.C. 154(b), the term of this patent shall be extended for 0 days.

(21) Appl. No.: 09/033,481

(22) Filed: Mar. 3, 1998

Related U.S. Application Data

(63) Continuation-in-part of application No. 08/859,112, filed on May 20, 1997, now abandoned.

(51) Int. Cl.$^7$ ........................................................ F16F 5/00
(52) U.S. Cl. ................................. 267/140.11; 267/140.14
(58) Field of Search .......................... 267/140.11, 140.14, 267/140.12, 140.13, 140.15; 248/550, 562, 566, 636, 638

(56) References Cited

U.S. PATENT DOCUMENTS

| | | | |
|---|---|---|---|
| 4,641,817 | * | 2/1987 | Clark et al. ...................... 267/140.11 |
| 4,711,206 | * | 12/1987 | Andra et al. ................. 267/140.11 X |
| 5,167,403 | * | 12/1992 | Muramatsu et al. ............. 267/140.13 |
| 5,183,243 | * | 2/1993 | Matsumoto ...................... 267/140.13 |
| 5,217,211 | * | 6/1993 | Ide et al. .......................... 267/140.13 |
| 5,314,173 | * | 5/1994 | Ide et al. .......................... 267/140.14 |
| 5,769,402 | * | 6/1998 | Ide et al. .......................... 267/140.14 |

FOREIGN PATENT DOCUMENTS

| | | |
|---|---|---|
| 60-40843 | 3/1985 | (JP) . |
| 6-29634 | 10/1986 | (JP) . |
| 3-12639 | 1/1991 | (JP) . |
| 3-125045 | 5/1991 | (JP) . |
| 4-60231 | 2/1992 | (JP) . |
| 4-277338 | 10/1992 | (JP) . |
| 5-149369 | 6/1993 | (JP) . |

* cited by examiner

Primary Examiner—Robert J. Oberleitner
Assistant Examiner—Pamela J. Rodriguez
(74) Attorney, Agent, or Firm—Pillsbury Madison & Sutro LLP Intellectual Property Group

(57) ABSTRACT

The liquid-sealing type vibration isolating apparatus of the present invention includes a coupler attached to a vibrating body, a holder, an insulator for absorbing and isolating vibration from the vibrating body at a position between the coupler and the holder, and a vibration isolating mechanism directly following the insulator and including liquid chambers sealing an incompressible fluid. This vibration isolating mechanism has a main chamber sealing a liquid, having a part of wall thereof formed by the insulator, an auxiliary chamber communicating with the main chamber via an orifice, and an equilibrium chamber provided in a portion of the main chamber via a diaphragm and having a varying volume in the chamber. The vibration isolating apparatus further includes switching means for introducing a negative pressure and the atmospheric pressure continuously or in synchronization with vibration of the vibrating body, and control means for controlling this switching operation.

1 Claim, 12 Drawing Sheets

LIQUID-SEALING TYPE VARIATION ISOLATING APPARATUS

This application is a continuation-in-part of U.S. patent application Ser. No. 08/859,112, filed May 20, 1997, now abandoned.

This application claims priority from foreign applications JP 08-150352 filed May 21, 1996; JP 08-241099 filed Aug. 22, 1996; JP 08-280248 filed Sep. 30, 1996; JP 08-287524 filed Oct. 9, 1996; JP 08-355127 filed Dec. 21, 1996; JP 08-348420 filed Dec. 26, 1996; JP 08-348421 filed Dec. 26, 1996; and JP 09-065447 filed Mar. 3, 1997, all of which are incorporated herein by reference.

BACKGROUND OF THE INVENTION

1. Field of the Invention

The present invention relates to a liquid-sealing type vibration isolating apparatus which gives a vibration isolating effect on the basis of the flowing action of a fluid (liquid) sealed therein. More particularly, the present invention relates to a liquid-sealing type vibration isolating apparatus in which the liquid in a liquid chamber is vibrated at a certain frequency, the vibrating apparatus thereof having a simple structure, and isolation of vibration of a plurality of kinds is effectively accomplished over a wide scope ranging from low to high frequency regions.

2. Description of the Related Art

A vibration isolating apparatus, particularly an automotive engine mount must be capable of coping with a wide range of frequencies because the engine serving as a power source is used under various conditions ranging from idling operation to the maximum velocity of revolutions. For this purpose, there has already been invented an apparatus known as a liquid-sealing type engine mount (vibration isolating apparatus) in which two liquid chamber are provided and are connected with an orifice, such as the one disclosed in Japanese Unexamined Patent Publication No. 4-60231.

The aforesaid known apparatus is designed to have two orifices to cope with two kinds of input frequency within the low-frequency region. The apparatus can cope (vibration isolation) with two kinds of vibration such as engine idling vibration and engine shaking by operating these two orifices. These kinds of vibration have however a frequency with a range of from 10 to 30 Hz. An automobile engine is used under diverse and various circumstances, and the range of frequencies of vibration and noise propagating through the engine and the engine mount supporting the engine covers a wide region. Recently, in particular, vibration and noise associated with engine noise including a dull sound which is a vibration within the higher frequency region, in addition to the foregoing idling vibration and engine shake are forming an issue.

More recently, tuning of an engine mount is becoming more common with a view to isolating a dull sound associated with vibration of a relatively high frequency within a range of from 100 to 600 Hz. For the purpose of coping with a plurality of conditions as described above, there has already been known a liquid-sealing type vibration isolating apparatus having a liquid chamber and a fluid bag to change the volume at a specific frequency within the fluid bag, as disclosed, for example, in Japanese Patent Publication No. 6-29634.

In this known apparatus, the fluid bag is provided in the liquid chamber to change the volume thereof at a prescribed frequency, thereby causing a liquid in the liquid chamber on the vibration input side to flow via an orifice toward another side liquid chamber. More specifically, in the low-frequency region mainly comprising idling vibration, the liquid pressure in the liquid chamber on the vibration input side is increased so as to obtain a high damping property. In the high-frequency region, on the other hand, increase in the liquid pressure in the liquid chamber on the vibration input side is avoided to obtain a low dynamic spring constant. For recent automotive engine mounts, however, a vibration isolating apparatus should cover idling vibration against which resonance phenomenon should be avoided by reducing the dynamic constant as vibration within the low-frequency region, and vibration associated with engine shaking against which vibration should be inhibited by increasing the damping property.

Further, in this known apparatus, a fluid pressure generating device is need for causing the volume thereof to be changed, so that there are raised the following problems.

(1) An additional space has to be secured in an engine room.

(2) The apparatus itself increases a production cost.

In order to achieve a vibration isolating apparatus capable of coping with these contradictory conditions, simple vibrating of the liquid in the liquid chamber on the vibration input side in the same or reversed phase is insufficient.

To cope with these multiple conditions, furthermore, there is already known an apparatus called a voice-coil type liquid-sealing type vibration isolating apparatus in which a liquid chamber is provided and which has a vibrator comprising a voice coil or the like vibrating at a certain frequency in the liquid chamber, as disclosed, for example, in Japanese Unexamined Patent Publication No. 5-149369. An apparatus of this type has however inevitably a complicated structure because of the necessity of a plurality of liquid chambers, a movable piece comprising a piston or the like in the liquid chamber and a voice coil for driving such a movable piece. The vibration isolating apparatus as a whole becomes unavoidably heavier because of shaking coils, permanent magnets and many other parts.

SUMMARY OF THE INVENTION

The present invention was developed to solve the problems as described above, and has an object to provide a vibration isolating apparatus capable of certainly inhibiting vibration occurring from a vibrating body from propagating in the vehicle room.

Another object of the present invention is to provide a liquid-sealing type vibration isolating apparatus permitting giving a low dynamic spring constant even in the high frequency region for the purpose of isolating vibration in a relatively high frequency region.

Further another object of the present invention is to provide a liquid-sealing type vibration isolating apparatus which can give a low dynamic spring constant (low dynamic spring property) for both vibration in a low-frequency region mainly comprising idling vibration and vibration in a high-frequency region causing a dull sound, and give a high damping property against vibration in a low-frequency region coming from engine shake.

To achieve these objects, according to the present invention, a liquid-sealing type vibration isolating apparatus is provided which comprises a coupler attached to a vibrating body, a holder attached to the vehicle body side, an insulator which is provided between the coupler and the holder and absorbs and isolates vibration from the vibrating body, and a vibration isolating mechanism which directly follows the insulator and is formed with a liquid chamber sealing a liquid which is an incompressible fluid; the vibration isolating mechanism comprising a main chamber having a wall thereof formed by a part of the insulator and sealing the liquid, an auxiliary chamber connected to the main chamber so that the liquid flows through an orifice, an equilibrium chamber which is provided at a part of the main chamber via a diaphragm and is formed so that the volume thereof in the chamber changes, and an air chamber which surrounds the auxiliary chamber via another diaphragm and constantly receives air; wherein there are further provided switching means which conducts a switching operation so as to alternately introduce any one of a negative pressure and the atmospheric pressure into the equilibrium chamber having the aforesaid construction constantly or in synchronization with engine vibration, and in addition, control means which controls the switching operation of the switching means.

By adopting the constitution as described above, the following effects are available in the present invention. In the present invention, more specifically, an equilibrium chamber is provided via a diaphragm in the main chamber, and a negative pressure or the atmospheric pressure is appropriately introduced into the equilibrium chamber. Introduction of the negative pressure or the atmospheric pressure is accomplished through switching means under control by the control means. That is, operation of this switching means causes the negative pressure to be periodically introduced at a certain frequency or causes a certain negative pressure to be continuously introduced. As required, the equilibrium chamber is kept in a state open to the open air. Therefore, in response to idling vibration of the engine forming a vibrating body, the pressure (volume) of the equilibrium chamber is altered through an ON/OFF operation of the switching means, thereby absorbing fluctuations of the liquid pressure-in the main chamber caused by idling vibration entered via the insulator. This results in a reduced dynamic spring constant of the spring system formed by the insulator and the vibration isolating mechanism. Idling vibration is thus absorbed and isolated.

To cope with high-frequency vibration within a range of from 100 to 600 Hz causing a dull sound, which is a problem during travel of a vehicle, the switching means is operated to bring the equilibrium chamber into a state open to the open air. As a result, the volume in the equilibrium chamber freely changes relative to high-frequency vibration entered via the insulator and the liquid in the liquid chamber. This permits free vibration of the insulator and the liquid in the liquid chamber, whereby the dynamic spring constant of the spring system formed by the vibration isolating mechanism is inhibited to a low level. An improved isolating effect is thus available against high-frequency vibration. In the present invention, as described above, the switching means comprising a switching valve or the like, the orifice and the equilibrium chamber permit absorption and isolation of multiple kinds of vibration.

The liquid is allowed to flow through an orifice connecting the main chamber and the auxiliary chamber to isolate engine shake which is vibration of a frequency further lower than idling vibration, thereby absorbing and isolating the engine shake. More specifically, since vibration associated with engine shake has a frequency of about 10 Hz, it is difficult to isolate vibration by reducing the dynamic spring constant. In the present invention, therefore, a certain negative pressure is introduced into the equilibrium chamber forming the vibration isolating mechanism so as to bring the volume of the equilibrium chamber to null. This allows the liquid to flow through an orifice formed between the main chamber and the auxiliary chamber, and viscous drag resulting from the liquid causes production of a prescribed damping force. This damping force leads to damping of engine shake.

In another means for achieving the foregoing objects, a vibration isolating mechanism comprising a liquid chamber and the like is provided in series with the insulator. More particularly, there is provided a liquid-sealing type vibration isolating apparatus, wherein the vibration isolating mechanism comprises a main chamber which comprises a liquid chamber arranged in series with the insulator and having a wall thereof formed by a part of the insulator, an auxiliary chamber connected to the main chamber so as to allow the liquid to flow via an orifice to the main chamber and separated by a partition plate comprising a rigid body from the main chamber, an equilibrium chamber formed via a diaphragm between the main chamber and the partition plate and arranged so as to introduce any one of the atmospheric pressure and a negative pressure, and an air chamber provided under the auxiliary chamber via another diaphragm and constantly fed with air. By adopting this configuration, in the present invention, vibration from the vibrating body is transmitted directly to the insulator and the liquid in the main chamber, thus further improving the vibration isolating effect, in addition to the foregoing means. A vibration isolating apparatus having an equilibrium chamber in the main chamber is formed on the basis of the conventional upright-type liquid-sealing type vibration isolating apparatus, thus permitting improvement of assembly merit of the vibration isolating apparatus as a whole.

The aforesaid objects are achieved according to the present invention also by the vibration isolating apparatus, wherein the length L1 of a duct line from the atmospheric pressure inlet to the equilibrium chamber is set at a value determined by the following formula:

$$0.85\ cT/4 \leq L1 \leq 1.15\ cT/4$$

where c is the sound velocity (340 m/sec) and T is a period of time (in seconds) during which the open air is introduced into the equilibrium chamber by the switching means.

The foregoing objects are achieved, according to the present invention, in the vibration isolating apparatus of the above-mentioned configuration, by providing an expansion chamber having a larger diameter than that of the duct line between the atmospheric pressure inlet and the switching means and setting the length L2 between the expansion chamber and the equilibrium chamber at a value determined by the following formula:

$$0.85\ cT/4 \leq L2 \leq 1.15\ cT/4$$

where c is the sound velocity (340 m/sec) and T is a period of time (in seconds) during which the open air is introduced into the equilibrium chamber by the switching means.

According to the vibration isolating apparatus of the present invention, furthermore, the coupler attached to the vibrating body and the insulator provided between the coupler and the holder attached to the vehicle body side absorb most of vibration transmitted from the vibrating body. The vibration isolating mechanism following directly the insulator further controls and absorbs vibration. In other words, the liquid sealed in the main liquid chamber and the auxiliary liquid chamber flows through the orifice under the effect of vibration, and this flow controls and absorbs vibration. At the same time, a negative pressure introduced from the negative pressure source and the atmospheric pressure introduced from the atmospheric pressure inlet are alternately introduced into the equilibrium chamber provided in a portion of the main liquid chamber via a diaphragm. This introduction is accomplished by a switching operation of the switching means under control by the control means at a frequency f required for synchronizing with vibration of the aforesaid vibrating body. This alternate introduction permits alternate introduction of the negative pressure and the atmospheric pressure at a frequency corresponding to the required frequency, and in response to this, the pressure in the equilibrium chamber, and hence the volume thereof change. This change in volume positively controls and absorbs changes in the liquid pressure in the main liquid chamber produced by vibration of the vibrating body and entered via the insulator.

Because the switching means is switched over by switching, this switching may cause generation of a harmonic component. In the present invention, however, the length L1 of the duct line from the atmospheric pressure inlet to the equilibrium chamber is set at a value determined by the following formula:

$$0.85\ cT/4 \leq L1 \leq 1.15\ cT/4$$

where c is the sound velocity (340 m/sec) and T is a period of time (in seconds) during which the open air is introduced into the equilibrium chamber by the switching means. A pulse may therefore be produced in the air introduced from the atmospheric pressure inlet, resulting in a temporary inertial supercharging. A pressure higher than the atmospheric pressure would thus be introduced into the equilibrium chamber. In parallel with this, the pressure waveform is corrected, thus resulting in elimination of the unnecessary harmonic component. Fluctuations of pressure in the equilibrium chamber therefore change into smooth behavior like a sine wave, hence permitting control of fluctuations of liquid pressure in the main liquid chamber in response to vibration of the vibrating body.

This is particularly effective when the length L1 of the duct line from the open air inlet to the equilibrium chamber cannot be set within the foregoing range. According to the present invention, an expansion chamber having a diameter larger than that of the duct line is provided between the open air inlet and the switching means and the length L2 of the duct line from the expansion chamber to the equilibrium chamber is set at a value determined by the following formula:

$$0.85\ cT/4 \leq L2 \leq 1.15\ cT/4$$

where c is the sound velocity (340 m/sec) and T is a period of time (in seconds) during which the open air is introduced into the equilibrium chamber by the switching means. By only appropriately adjusting the length L2 of the duct line from the expansion chamber to the equilibrium chamber, therefore, the effect substantially the same as above is available. Therefore, when the length L1 of the duct line from the open air inlet to the equilibrium chamber cannot be set within the above range because of a particular necessity in piping, it suffices to provide an expansion chamber having a length L2 satisfying the above formula.

In addition, in the vibration isolating apparatus of the present invention, the required frequency is the one required for synchronizing with an idling vibration of the engine.

Further, the liquid-sealing type vibration isolating apparatus for achieving another object of the present invention comprises a main chamber having a wall thereof formed by a part of the insulator and receiving vibration directly propagating from the insulator, an auxiliary chamber connected to the main chamber via a small-diameter orifice so as to allow the liquid to flow and separated by a first partition plate comprising a rigid body from the main chamber, and an equilibrium chamber formed via a diaphragm between the main chamber and the first partition plate and receiving any one of a negative pressure and the atmospheric pressure; and the liquid-sealing type vibration isolating apparatus further comprising a second partition plate serving also as a stopper, provided in the main chamber above the diaphragm forming the equilibrium chamber, a second orifice comprising a large-diameter orifice in a portion of the second partition plate, switching means for performing a switching operation so as to alternately introduce any one of the negative pressure and the atmospheric pressure into the equilibrium chamber, in synchronization with engine vibration, and control means for controlling the switching operation of the switching means.

This constitution provides the following functions. First, as to idling vibration, the negative pressure and the atmospheric pressure are alternately introduced at a specific frequency into the equilibrium chamber provided under the main chamber by operating the switching means. That is, the pressure (volume) in the equilibrium chamber is altered by ON/OFF-operating the switching means, thereby absorbing fluctuations of liquid pressure in the main chamber caused by idling-vibration entered via the insulator. This reduces the dynamic spring constant of the spring system formed by the insulator and the vibration isolating mechanism. This permits absorption and isolation of idling vibration.

As to engine shake which is vibration of a frequency further lower than that of idling vibration, the liquid is caused to flow through the small-diameter orifice connecting the main chamber and the auxiliary chamber, thereby absorbing and isolating engine shake. More specifically, because engine shake vibration has a frequency of about 10 Hz, it is difficult to isolate vibration by reducing the dynamic spring constant. In the present invention, therefore, the volume of the equilibrium chamber is kept null by continuously introducing a certain negative pressure into the equilibrium chamber forming the vibration isolating mechanism. This allows the liquid to flow through the small-diameter orifice formed between the main chamber and the auxiliary chamber, thereby causing generation of a prescribed damping force under the effect of viscous drag resulting from the flow of the liquid. Engine shake is thus damped by the action of this damping force.

On the other hand, with respect to the vibration of a high frequency of about 100 to 600 Hz which causes a dull sound during travel of a vehicle, the switching means is operated to bring the equilibrium chamber into the state open to the open air. The volume in the chamber can thus freely change in response to vibration of a frequency entered via the insulator and the liquid in the main chamber. The liquid in the main chamber is allowed to freely flow through the large-diameter orifice (second orifice) of the second partition plate provided in the main chamber, thus reducing the dynamic spring constant of the spring system formed by the vibration isolating mechanism to a low level. The isolating effect against vibration in the high-frequency region is thus improved. In the present invention, as described above, multiple kinds of vibration can be absorbed and isolated under the effect of the equilibrium chamber capable of changing the inner volume thereof by operating the switching means comprising a switching valve or the like.

In the present invention, the second partition plate comprising a rigid body is provided above the diaphragm forming the equilibrium chamber in the main chamber. When vibration entered from the vibrating body has a large amplitude, the downward stroke of the upper coupling member caused by this vibration from the vibrating body is arrested at this second partition plate. In other words, the second partition plate serves as an inner stopper of this vibration isolating apparatus. Under the effect of this stopper function, the diaphragm forming the equilibrium chamber is protected upon input of vibration. As a result, the change in volume of the equilibrium chamber is kept normal, thus permitting reduction of the dynamic spring constant.

In the liquid-sealing type vibration isolating apparatus for achieving further another object of the present invention, the vibration isolating mechanism comprises a liquid chamber sealing an incompressible fluid, an equilibrium chamber receiving a negative pressure or the atmospheric pressure, and an elastic diaphragm partitioning the liquid chamber and the equilibrium chamber; a plurality of said vibration isolating mechanisms are provided; a first liquid chamber provided in a first liquid chamber provided in a first vibration isolating mechanism from among these plurality of vibration isolating mechanisms and a second liquid chamber provided in a second vibration isolating mechanism are connected with a large-diameter orifice; the first liquid chamber provided in the first vibration isolating mechanism and a third liquid chamber provided in a third vibration isolating mechanism are connected with a small-diameter orifice; any one of a negative pressure and the atmospheric pressure is continuously introduced into a first equilibrium chamber provided in the first vibration isolating mechanism via switching means alternately in synchronization with engine vibration; and any one of a negative pressure and the atmospheric pressure is continuously introduced into a second equilibrium chamber provided in the second vibration isolating mechanism in compliance with a switching operation of the switching means in response to the traveling state of the vehicle.

By adopting the foregoing constitution, the following effects are available in the present invention. Vibration from the vibrating body is transmitted via the coupling member to the insulator made of a rubber material or the like. The insulator vibrates or deforms as a result and absorbs or isolates most of the entered vibration. While most of the vibration is thus isolated at the insulator, a part thereof is not isolated at the insulator, but is isolated at the vibration isolating mechanism following the insulator. Now, detailed operations of the individual vibration isolating mechanisms will be described below. First, the vibration isolating function against engine idling vibration will be described. In this case, the frequencies to be covered range from about 20 to 40 Hz. A negative pressure is therefore introduced through the switching means into the second equilibrium chamber in FIG. 1 to bring the volume of the second equilibrium chamber to null. That is, the diaphragm in the second vibration isolating mechanism is kept inoperable. In this state, a negative pressure and the atmospheric pressure are alternately introduced into the first equilibrium chamber of the first vibration isolating mechanism at a certain cycle (frequency). As a result, the liquid in the first liquid chamber provided under the insulator is about to flow through the small-diameter orifice to the third liquid chamber. However, because the negative pressure or the atmospheric pressure is introduced into the first equilibrium chamber so that the diaphragm is applied with vibration at a frequency higher than the liquid resonance frequency of the liquid present in the orifice, the liquid in the first liquid chamber does not flow toward the small-diameter orifice. The status of the liquid pressure in the first liquid chamber largely fluctuates, and the liquid in the first liquid chamber is vibrated in the same phase as the entered vibration. This inhibits increase in the dynamic spring constant in the present vibration isolating apparatus. That is, reduction of the dynamic spring constant is successfully achieved.

As to engine shake which is vibration caused during travel of a vehicle and has a frequency further lower than the idling vibration, a negative pressure is introduced into the first equilibrium chamber to bring the volume of the first equilibrium chamber to hull. In other words, the diaphragm of the first vibration isolating mechanism is kept inoperable. In this state, when vibration is transmitted from a vibrating body such as an engine to the upper coupling member, the liquid pressure in the first liquid chamber increases, and the liquid in the first liquid chamber flows through the large-diameter orifice to the second liquid chamber of the second vibration isolating mechanism. The flow of the liquid in the first liquid chamber through the large-diameter orifice makes it available a high damping property. As a result, vibration of engine shake having a frequency of about 10 Hz is inhibited. Vibration caused upon engine cranking, or vibration of a large amplitude caused upon sudden start or sudden acceleration, which is vibration of a large amplitude at a further lower frequency is inhibited under the effect of the small-diameter orifice. The small-diameter orifice causes the liquid in the first liquid chamber to flow to the third liquid chamber against input of an initial load caused upon installation on the vibrating body, to keep balance of inner pressure in the individual liquid chambers.

As to vibration within a high frequency region of from 100 to 600 Hz, which poses the problem of a dull sound in the vehicle room, the atmospheric pressure is introduced into the first equilibrium chamber of the first vibration isolating mechanism to bring the first equilibrium chamber into the state open to the open air. At the same time, a negative pressure is continuously introduced into the second equilibrium chamber forming the second vibration isolating mechanism to bring the volume of the second equilibrium chamber to null. The vibration transmitted through the upper coupling member into the first liquid chamber consequently vibrates the liquid in the first liquid chamber. However, since the first equilibrium chamber constituting the first vibration isolating mechanism is in the state open to the open air, the diaphragm provided there freely vibrates. As a result, increase in the liquid pressure in the first liquid chamber is avoided against the entered vibration within the high frequency region, thus reducing the dynamic spring constant of this vibration isolating apparatus as a whole. This isolates vibration within the high frequency region which causes a dull sound.

In the present invention, as described above, the first equilibrium chamber and the second equilibrium chamber are independently kept in a negative pressure state or the atmospheric pressure state, or a negative pressure and the atmospheric pressure are alternately introduced at a specific cycle (frequency) into the first equilibrium chamber. As a result, a low dynamic spring constant is available over a wide range of frequency regions ranging from low-frequency vibration mainly comprising idling vibration to high-frequency vibration centering around the dull sound. Reduction of the dynamic spring constant thus permits isolation of idling vibration and vibration associated with the dull sound. Engine shake which is low-frequency vibration can be isolated (inhibited) by obtaining a high damping property.

In the vibration isolating apparatus of the above constitution of the present invention, the housing space is a side branch having a closed end. Therefore, the vibration isolating apparatus is surely provided according to the above constitution.

Furthermore, the vibration isolating apparatus of the present invention in another embodiment comprises a coupler attached to a vibrating body; a holder attached to the vehicle body side; an insulator provided between the coupler and the holder to absorb vibration from the vibrating body; a vibration isolator having a vibration isolating mechanism directly following the insulator and comprising a main liquid chamber having a wall thereof formed by a part of the insulator and sealing a liquid therein, an auxiliary liquid chamber connected to the main liquid chamber so as to cause the liquid to flow via an orifice, and an equilibrium chamber provided at a portion of the main liquid chamber via a diaphragm so as to change the volume thereof in the chamber; switching means performing a switching operation based on a frequency required for synchronizing with vibration of the vibrating body so as to introduce alternately a negative pressure from a negative pressure source and the atmospheric pressure from an atmospheric pressure inlet to the equilibrium chamber; and control means for controlling the switching means; wherein: a resistance for slowing down the introduction of the negative pressure or the atmospheric pressure into the equilibrium chamber is provided in the middle of a communicating path communicating between the switching means and the equilibrium chamber.

In the vibration isolating apparatus of the above configuration of the present invention, the housing space is a side branch having a closed end.

In the vibration isolating apparatus of the above configuration of the present invention, the effects substantially the same as those of the apparatus of the preceding configuration are available. A resistance is provided in the middle of a communicating path communicating between the switching means and the equilibrium chamber. The presence of this resistance slows down the increasing and decreasing rates of the pressure in the equilibrium chamber. Fluctuations of pressure in the equilibrium chamber therefore exhibit a smooth behavior, thus permitting control of fluctuations of the liquid pressure in the main liquid chamber in response to vibration of the vibrating body.

The liquid-sealing type vibration isolating apparatus of the present invention for achieving further another object thereof comprises an upper coupling member attached to a vibrating body; a lower coupling member attached to a member or the like on the vehicle body side; an insulator provided between the upper coupling member and the lower coupling member to absorb and isolate vibration from the vibrating body; a main chamber having a wall thereof formed by a part of the insulator and sealing a liquid; an auxiliary chamber connected to the main chamber via a first orifice and having a part of the wall thereof formed by a first diaphragm; a third liquid chamber connected to the main chamber via a second orifice and formed so as to receive the liquid in the main chamber; and an equilibrium chamber partitioned and formed by a second diaphragm having a higher spring constant than the first diaphragm relative to the third liquid chamber and receiving any one of the atmospheric pressure and a negative pressure; the liquid-sealing vibration type isolating apparatus further comprises switching means for performing a switching operation so as to alternately introduce any one of the negative pressure and the atmospheric pressure into the equilibrium chamber, in synchronization with engine vibration; and control means controlling the switching operation of the switching means.

By adopting the constitution as described above, the following functions are available in the present invention.

As to idling vibration, a negative pressure and the atmospheric pressure are alternately introduced at a specific frequency into the equilibrium chamber by operating the switching means. More specifically, the pressure (volume) in the equilibrium chamber is altered by operating the switching means at a specific frequency to absorb fluctuations of the liquid pressure in the insulator and the main chamber caused by idling vibration entered through the insulator. As a result, there occurs a decrease in the dynamic spring constant of the spring system formed by the insulator and the vibration isolating mechanism. Particularly in the apparatus of the present invention, operation of the second diaphragm causes the second orifice having a prescribed volume to connect the third liquid chamber subjected to pressure fluctuations and the main chamber, and the liquid in the second orifice resonates with fluctuations of the liquid pressure of the liquid in the main chamber under the effect of operation of the equilibrium chamber, i.e., operation of the second diaphragm. Changes in the power generated (vibrating energy) for the entire vibration isolating mechanism are in a state of sine wave not containing high-frequency component noise, and this ensures absorption and isolation of idling vibration. It is also possible to avoid occurrence of high-frequency vibration which may accompany the isolation of idling vibration.

Regarding engine shake which is vibration of a frequency further lower than idling vibration, the liquid is caused to flow in the first orifice connecting the main chamber and the auxiliary chamber, thereby absorbing and isolating engine shake. More specifically, when vibration of engine shake is entered (vibration input) into the main chamber, the liquid in the main chamber receives pressure and acts to move the second diaphragm downward through the second orifice and the third liquid chamber. However, the second diaphragm forming the equilibrium chamber has become harder to deform with a higher spring constant than the first diaphragm forming part of the auxiliary chamber. Upon input of engine shake into the main chamber, therefore, the liquid in the main chamber flows through the first orifice toward the auxiliary chamber side prior to the deformation of the second diaphragm and to the volume change of the equilibrium chamber partitioned and formed by the second diaphragm. A high damping property (high damping force) is available from the flowing motion of the liquid in the first orifice, thereby inhibiting (damping) engine shake.

In the liquid-sealing type vibration isolating apparatus of the present invention as described above, a hardly deformable structure is adopted as a whole for the second diaphragm forming the equilibrium chamber. That is, in the liquid-sealing type vibration isolating apparatus, the second diaphragm has a constitution having stopper-like projections always in contact with both the partition plate forming the lower surface of the equilibrium chamber and the plate partitioning the main chamber and the third liquid chamber, these projections being arranged on the upper and lower sides near the center of the diaphragm. By adopting the constitution as described above, in the present invention, idling vibration is coped with by introducing any one of a negative pressure and the atmospheric pressure at a prescribed cycle into the equilibrium chamber through operation of the switching means. As a result, the second diaphragm deforms (displaces) under the effect of elastic deformation of the flat portion not containing projections, thereby vibrating the liquid in the third liquid chamber provided above the second diaphragm. This causes the vibrating force to propagate through the second orifice into the main chamber and acts to inhibit the increase in the liquid pressure in the main chamber. Reduction of the dynamic spring constant for the entire vibration isolating apparatus is thus accomplished upon input of idling vibration.

Engine shake is on the other hand coped with by bringing the equilibrium chamber into the state open to the open air through operation of the switching means. When engine shake is entered into the main chamber in this state, fluctuations of the liquid pressure in the main chamber are transmitted through the second orifice and the third liquid chamber to the second diaphragm in response thereto. The deformation region of the second diaphragm itself has however become narrower because of the presence of the projections, thus making it harder to deform (displace). The liquid in the main chamber therefore flows through the first orifice toward the auxiliary chamber having the wall thereof formed by the easily deformable first diaphragm. A high damping property (high damping force) of the vibration isolating apparatus is available from this flowing motion of the liquid to the first orifice. This high damping force inhibits (damps) the engine shake.

In the liquid-sealing type vibration isolating apparatus of the constitution described above, the construction around the second diaphragm partitioning the third liquid chamber from the equilibrium chamber comprises a rubber-film-like diaphragm, and a spring serving to always push back the rubber-film-like diaphragm toward the third liquid chamber. By adopting this constitution in the apparatus of the present invention, as in the preceding constitution, against idling vibration, an engine negative pressure and the atmospheric pressure are alternately introduced into the equilibrium chamber by operating the switching means, thereby causing the second diaphragm to deform in the state resisting to the spring reaction force and eventually preventing the liquid pressure in the main chamber from increasing. As a result, the dynamic spring constant for the vibration isolating apparatus as a whole is reduced upon input of idling vibration, thus permitting isolation of idling vibration.

To cope with engine shake, the pressure transmitted through the second orifice and the third liquid chamber to the second diaphragm is received with the spring reaction of the spring so as not to cause deformation (displacement) of the second diaphragm. As a result, the liquid in the main chamber flows through the first orifice toward the auxiliary chamber having the wall partially formed by the easily deformable first diaphragm. A high damping property is available from the flowing motion of the liquid in the main chamber into the first orifice, thus eventually accomplishing damping (inhibition) the engine shake.

Another liquid-sealing type vibration isolating apparatus of the present invention is characterized in that the vibration isolating mechanism is in a cylindrical shape. More specifically, the apparatus comprises an inner cylinder forming a coupler attached to a vibrating body and having a cylindrical shape; an outer cylinder forming a holder attached to the vehicle body side and having a cylindrical shape; an insulator provided around the inner cylinder between the inner cylinder and the outer cylinder; and a vibration isolating mechanism provided around the insulator and sealing a liquid which is an incompressible fluid; the vibration isolating mechanism comprising a main chamber having a wall thereof formed by a part of the insulator; an auxiliary chamber connected to the main chamber so as to allow the liquid to flow via an orifice and separated from the main chamber by a partition plate comprising a rigid body; an equilibrium chamber provided at a part of the main chamber via a diaphragm and formed so that the volume thereof in the chamber changes; and an air chamber provided outside the auxiliary chamber via another diaphragm and constantly receiving air; the cylindrical liquid-sealing type vibration isolating apparatus further comprising switching means performing a switching operation so as to cause continuous and alternate introduction of any one of a negative pressure and the atmospheric pressure in synchronization with engine vibration, and control means for controlling the switching operation of the switching means. By adopting this constitution of the present invention, it is possible to achieve further downsizing and reduction of weight, and to save the space for supporting the vibrating body.

DETAILED DESCRIPTION OF THE PREFERRED EMBODIMENTS

Now, an embodiment of the present invention will be described with reference to the drawings. An engine as a vibrating body is mounted via a plurality of engine mounts shown 3 on a vehicle body. The engine mount provided on the rear side is of the liquid-sealing type conventionally used in general, of which a detailed description is therefore omitted here. The engine mount 3 provided on the front side is of the liquid-sealing type and has a configuration permitting alternate introduction of a negative pressure and the atmospheric pressure, which will be described in detail later.

The engine has a plurality of combustion chambers (V-type 6 cylinders in the present embodiment), and air is sucked and introduced through an air cleaner and an air inlet path into each combustion chamber. A throttle valve is provided in the middle of the air inlet path, and the flow rate of sucked air flowing through the air inlet path is adjusted by opening/closing this throttle valve. A fuel injecting valve not shown is provided in a port immediately preceding the combustion chamber of the air inlet path. A combustible mixed gas is formed by a fuel injected from this injecting valve and the aforesaid sucked air and introduced into the combustion chamber. As the configuration itself of an engine is conventionally known, a further description thereof is omitted here.

Figure 1:
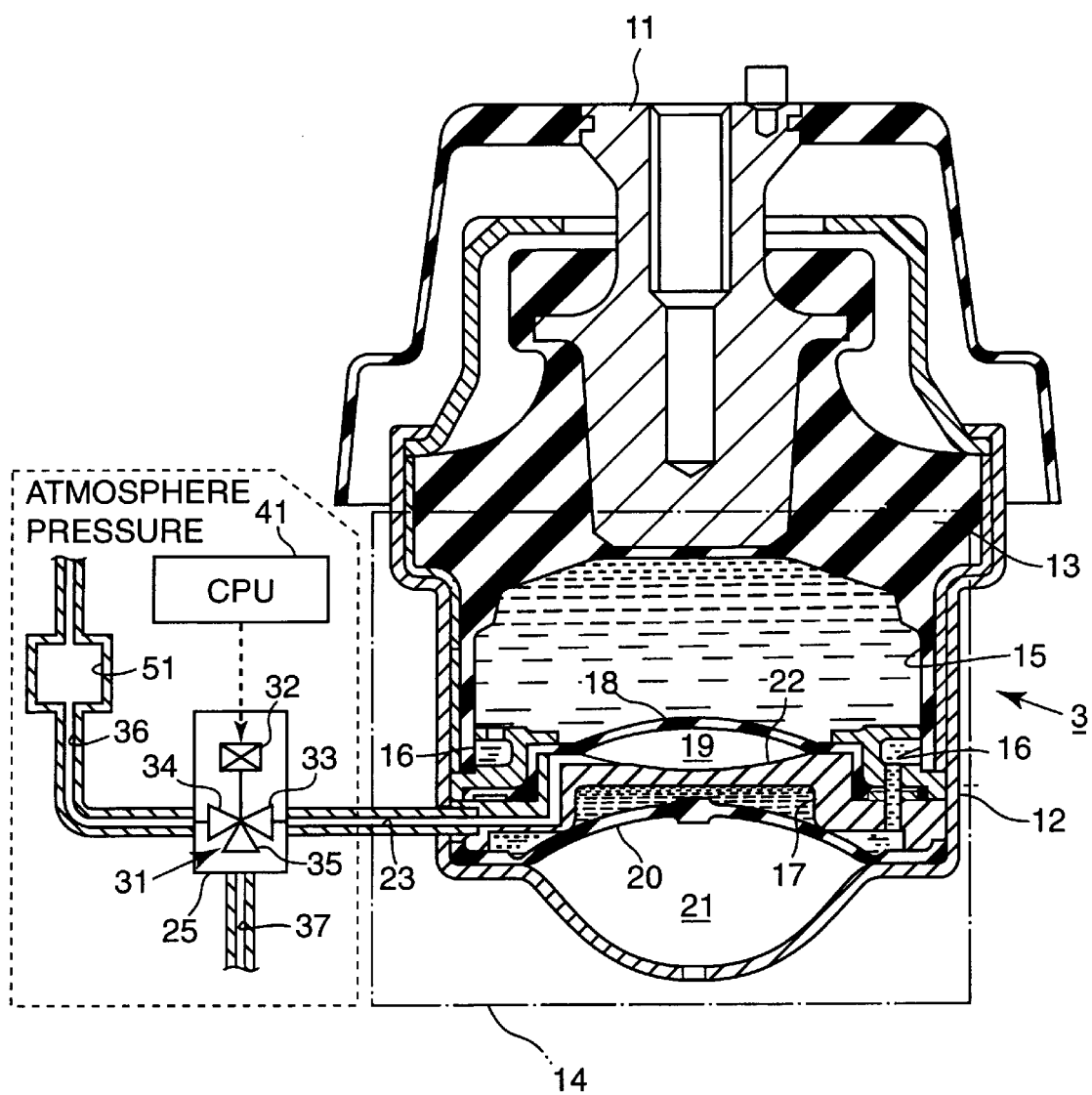
FIG. 1 is a sectional view illustrating an engine mount and the like in accordance with an embodiment of the present invention.

Now, the construction of the foregoing engine mount 3 will be described below. As shown in FIG. 1, the engine mount 3 has a coupler 11 as a fitting attached to the engine 1, a holder 12 attached to the vehicle body side, an insulator 13 provided between the coupler 11 and the holder 12 for mainly absorbing vibration transmitted from the engine 1, and a vibration isolating mechanism 14 provided immediately following the insulator 13. The insulator 13 is made of a vibration-proof rubber material and connected integrally to the coupler 11 by vulcanization bonding or the like. The vibration isolating mechanism 14 has a wall thereof formed by a part of the insulator 13 and comprises therein a main liquid chamber 15 sealing a liquid therein, an auxiliary liquid chamber 17 connected to the main liquid chamber 15 via an orifice 16 to allow the liquid to flow, an equilibrium chamber 19 provided in a portion of the main liquid chamber 15 via a first diaphragm 18 and formed so as to permit a change in the volume thereof, and an air chamber 21 provided around (under) the auxiliary liquid chamber 17 via a second diaphragm 20 and always receiving introduced air. The main liquid chamber 15 and the auxiliary liquid chamber 17 are separated by a partition plate 22.

A communicating path 23 is provided in the equilibrium chamber 19, and an end of this communicating path 23 communicates with a vacuum switching valve (VSV) 31 forming switching means 25 in a pressure control portion as encircled with a dash line in FIG. 1. The VSV 31 is, for example, a three-way valve ON/OFF-switched over by a solenoid 32, and has a first, a second and a third port 33, 34 and 35. The first port 33 communicates through the communicating path 23 with the equilibrium chamber 19, as described above. As shown in FIG. 1, the second port 34 communicates with the air inlet path in the upstream of the throttle valve via an atmospheric pressure duct line 36. The third port 35 communicates with the air inlet path in the downstream of the throttle valve (surge tank) via a negative pressure duct line 37. A vacuum tank as a negative pressure source is provided in the middle of the negative pressure duct line 37 to permit constant storage of a negative pressure generated in the downstream of the throttle valve.

The VSV is controlled by a central processing unit (CPU) 41 as control means. This CPU issues a signal to the effect of ON/OFF switching over the VSV 31 at intervals of, for example, a predetermined period. When the CPU 41 gives an output of an ON signal, the first port 33 and the second port 34 are brought into the communicating state, and sucked air (atmospheric pressure) in the upstream of a throttle valve 7 is introduced into the equilibrium chamber 19. When an OFF signal is issued by the CPU 41, on the other hand, the first port 33 and the third port 35 are brought in to the communicating state, and sucked air (negative pressure) generated in the down-stream of the throttle valve 7 and stored in the vacuum tank 38 is introduced into the equilibrium chamber 19. In this embodiment, the vibration isolating apparatus is composed of the above-mentioned engine mount 3, the VSV 31 and the CPU 41.

Now, the features of this embodiment will be described. In this embodiment, a box-shaped expansion chamber 51 having a larger diameter than that of the atmospheric pressure duct line 36 is provided in the middle of the duct line 36. The positional relationship of the expansion chamber 51 is important in this embodiment. More specifically, upon introduction of the open air through the atmospheric pressure duct line 36 into the equilibrium chamber 19, pulsation is caused in the sucked air, and the frequency of this pulsation is determined by the length L2 of the duct line between the equilibrium chamber 19 and the expansion chamber 51. In this embodiment, the length L2 is set so as to satisfy the following formula:

$$0.85 \ c/4f \leq L2 \leq 1.15 \ c/4f$$

where, c is the sound velocity (340 m/sec) and f is the required frequency (for example, the one corresponding to the idling frequency)[Hz].

Then, operations and effects of this embodiment having the configuration as described above will be described below.

In the present embodiment, most of the vibration transmitted from the engine 1 is absorbed by the insulator 13. Vibration is further controlled and absorbed by the vibration isolating mechanism 14 immediately following the insulator 13. That is, the liquid sealed in the main liquid chamber 15 and the auxiliary chamber 17 flows through the orifice 16 as a result of vibration, and the vibration is controlled and absorbed by this flow.

Along with this, a negative pressure from the vacuum tank and the negative pressure duct line 37 and the atmospheric pressure from the atmospheric pressure duct line 36 are alternately introduced into the equilibrium chamber 19 provided via the first diaphragm 18 in a portion of the main liquid chamber 15. This introduction is accomplished by switching of the VSV 31 controlled by the CPU 41 on the basis of the required frequency (for example, the one corresponding to the idling frequency) f. This switching permits alternate introduction of the negative pressure and the atmospheric pressure at a frequency corresponding to the required frequency f, and the pressure and hence the volume of the equilibrium chamber 19 change in response to this introduction. Such a change in the volume positively controls and absorbs fluctuations of the liquid pressure in the main liquid chamber 15, produced by the engine 1 vibration and entered through the insulator 13.

Figure 2:
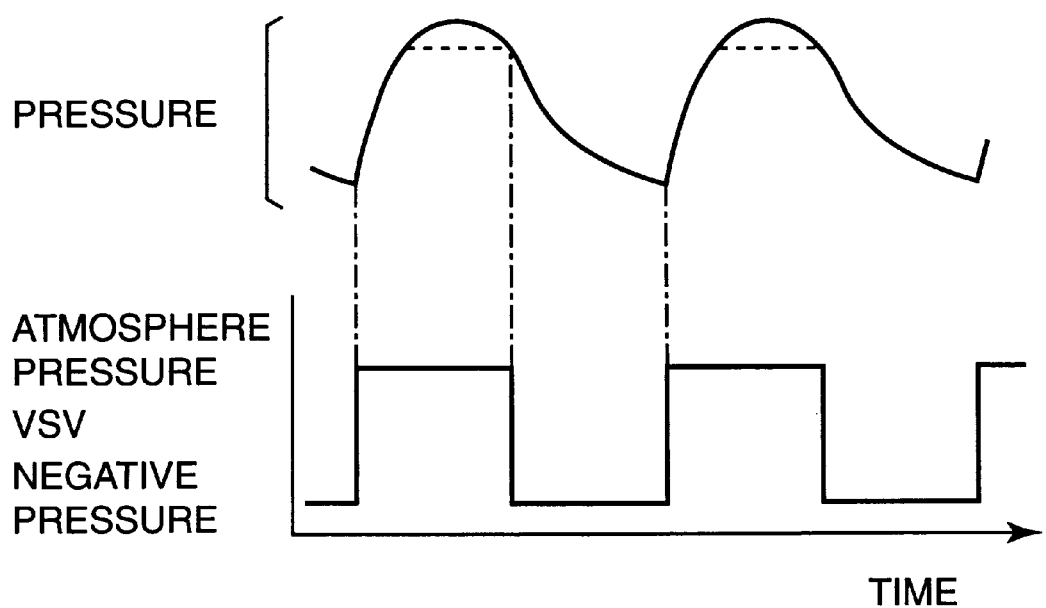
FIG. 2 is a timing chart illustrating the behavior of a VSV and pressure in an equilibrium chamber with respect to the lapse of time in accordance with an embodiment of the present invention.

Because the VSV 31 is to be changed over by switching, a harmonic component may be produced along with this switching. To avoid this inconvenience, in this embodiment, the length L2 between the equilibrium chamber 19 and the expansion chamber 51 is set at a value determined by the foregoing formula. Pulsation is therefore produced in air introduced from the atmospheric pressure duct line 36, thus temporarily bringing about an inertial supercharging state. As shown in FIG. 2, a pressure higher than the atmospheric pressure would therefore be introduced into the equilibrium chamber 19. At the same time, a pressure waveform is corrected, and this would eventually eliminate the unnecessary harmonic component. The pressure in the equilibrium chamber 19 therefore exhibits a smooth behavior like a sine wave, thus permitting control of fluctuations of liquid pressure in the main liquid chamber 15 in agreement with vibration of the engine 1. The driver of the vehicle can consequently inhibit more certainly the vibration generated from the engine from propagating into the vehicle room.

According to the present embodiment, the expansion chamber 51 is provided in the middle of the atmospheric pressure duct line 36. Propagation of vibration into the vehicle room is inhibited by setting the length L2 between the equilibrium chamber 19 and the expansion chamber 51 at a value satisfying the foregoing formula. The same effects as those described above are substantially available only by appropriately adjusting the length L2 of the duct line between the expansion chamber 51 and the equilibrium chamber 19. Therefore, even when an arbitrary length of the atmospheric pressure duct line 36 cannot be set for piping convenience of the duct line, it is possible to inhibit propagation of vibration without fail.

In the present embodiment, furthermore, the present invention is applicable to a case where an engine mounted on a vehicle body is the vibrating body. It is therefore possible to effectively control and absorb vibration generated by the engine.

In addition, according to this embodiment, the negative pressure source should be based on a negative pressure produced in the downstream of the throttle valve provided in the middle of the air intake path of the engine. It is therefore possible to utilize an air intake system of an ordinary engine, thus eliminating the necessity of a separate negative pressure source, and permitting inhibition of the increase in cost.

Further, according to this embodiment, the required frequency f is synchronized with the idling vibration. It is therefore possible to effectively control and absorb the idling vibration of the engine.

Application of the present invention is not limited to the above, but the details may be modified as follows.

(1) While the expansion chamber 51 has been provided in the middle of the atmospheric pressure duct line 36 in the foregoing embodiment, a constitution without an expansion chamber 51 may be adopted. In this case, the length L1 of the duct line between the atmospheric pressure inlet and the equilibrium 19 should take a value determined by the following formula:

$$0.85\ cT/4 \leq L1 \leq 1.15\ cT/4$$

(where, c is the sound velocity [340 m/sec], and T is the period of time [in seconds] during which the open air is introduced through the VSV 31 into the equilibrium chamber 19), and:

$$0.85\ c/4f \leq L2 \leq 1.15\ c/4f.$$

Figure 7:
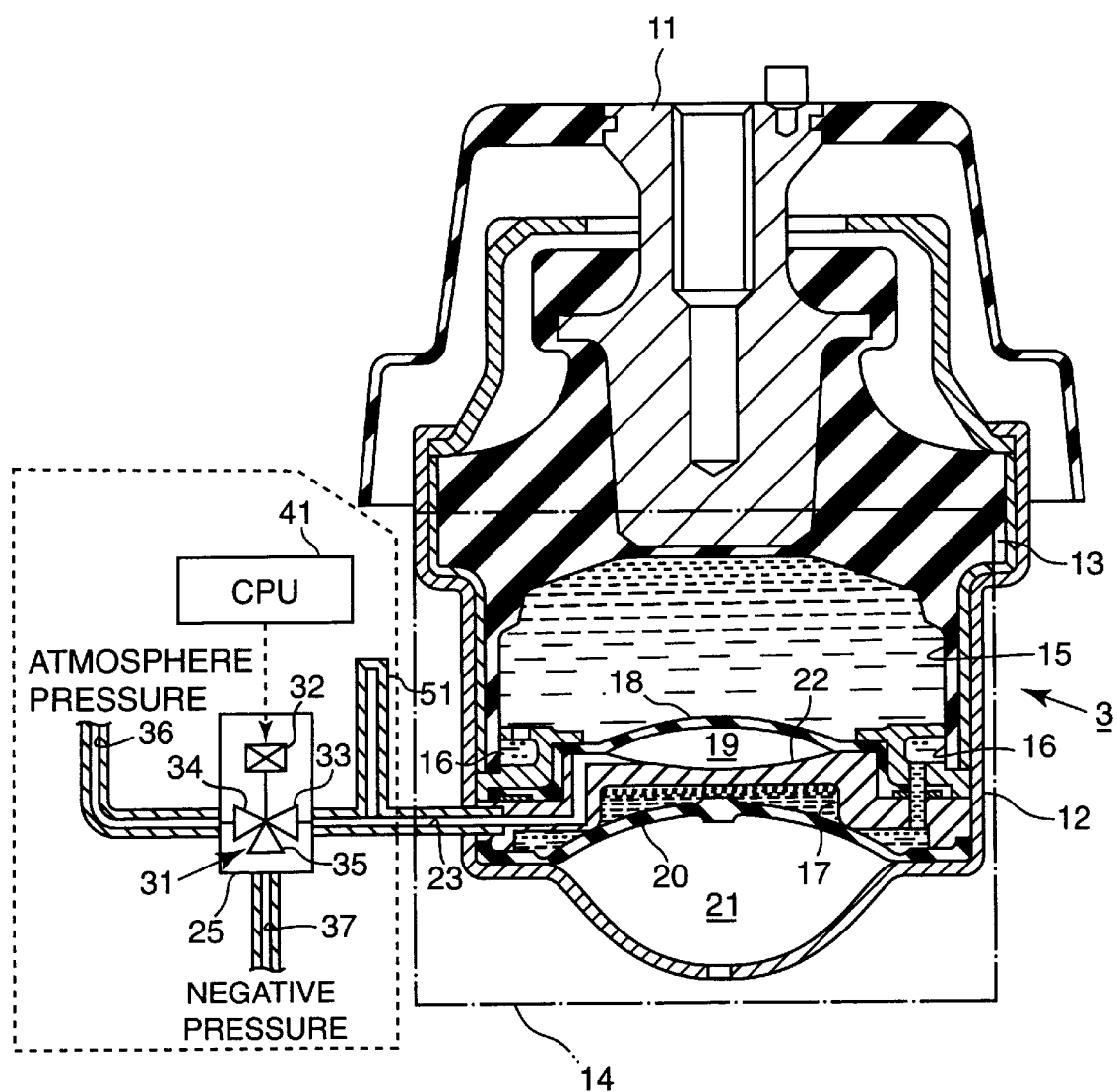
FIG. 7 is a sectional view illustrating an engine mount and the like in accordance with further another embodiment of the present invention.
Figure 9:
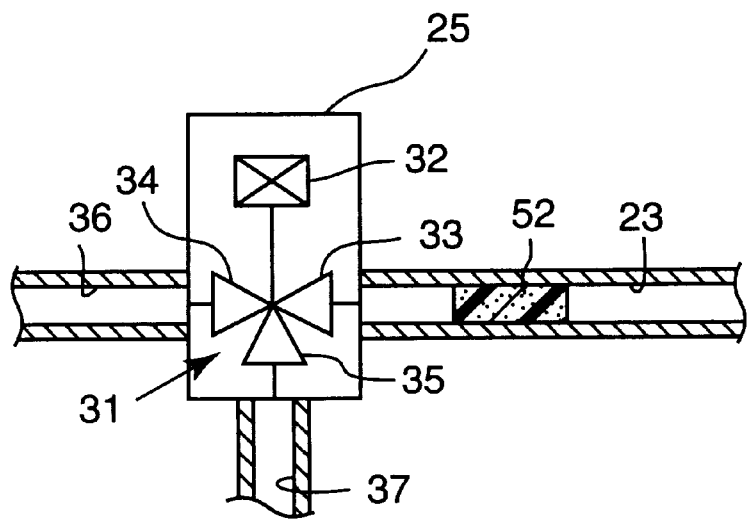
FIG. 9 is a partially enlarged sectional view illustrating further another embodiment of the present invention.

And, in this embodiment, as shown in the embodiment of FIG. 7, the communication path 23 may provide with a side branch, and as shown in the embodiment of FIG. 9, the communication path 23 may provide with a resistance portion. Then, the expansion chamber 51 may be used together with the side branch.

Figure 3:
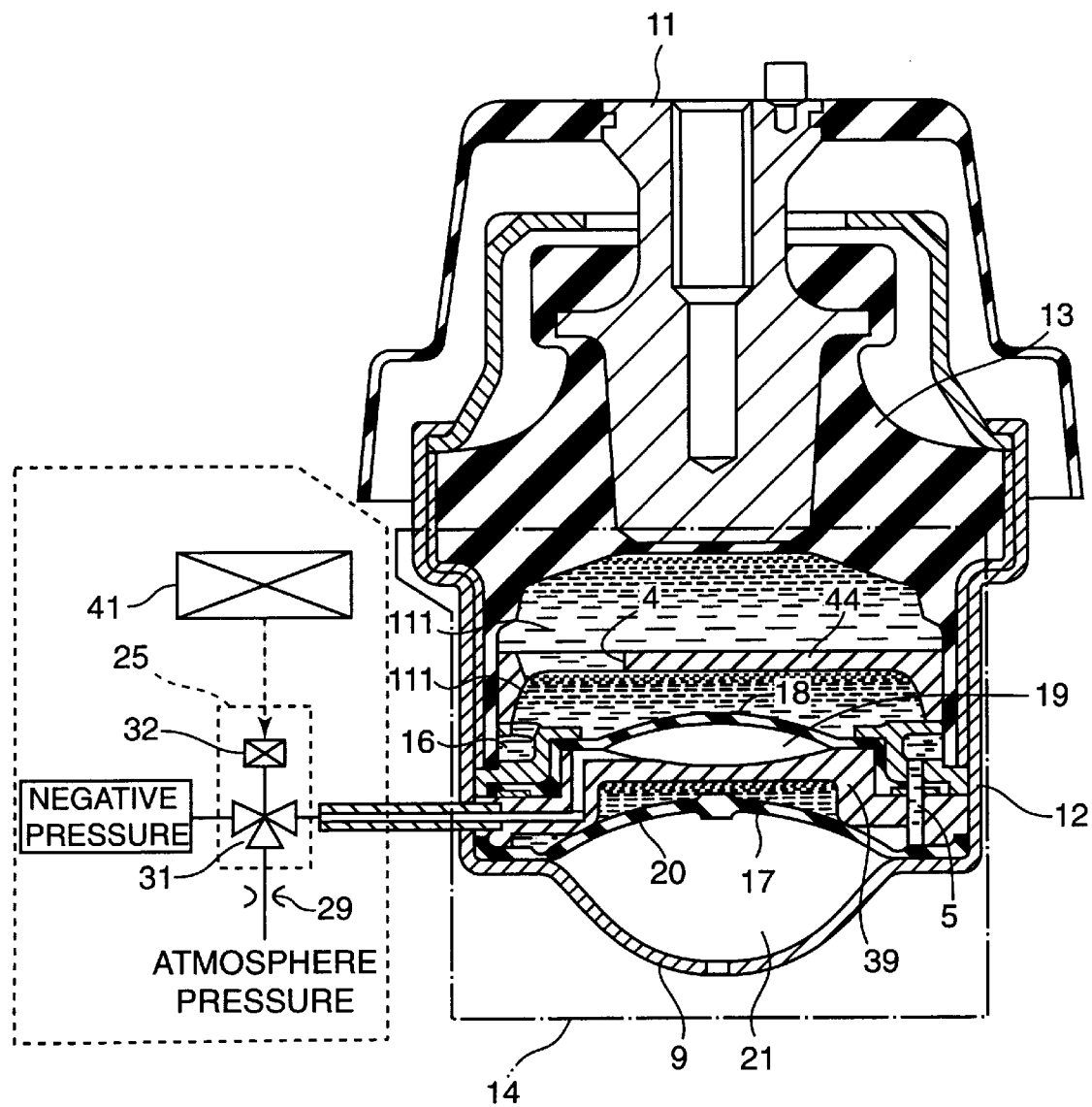
FIG. 3 is a longitudinal sectional view illustrating a whole configuration of a vibration isolating mechanism in accordance with another embodiment of the present invention.

Now, another embodiment of the present invention will be described below. The basic constitution of this embodiment comprises, as shown in FIG. 3, an upper coupling member, i.e., a coupler 11, attached to a vibrating body, a lower coupling member, i.e., a holder 12, attached to a member or the like on the vehicle body side, an insulator 13 provided between the upper coupling member 11 and the lower coupling member 12 for absorbing and isolating vibration from a vibrating body, liquid chambers 111 and 17 sealing a liquid which is an incompressible fluid, provided in series with the insulator 13, and a vibration isolating mechanism 14 formed by an air chamber 21 provided via a diaphragm 20 below these liquid chambers.

In this basic constitution, the aforesaid vibration isolating mechanism 14 comprises a main chamber 111 comprising a liquid chamber having a wall thereof formed by a part of the foregoing insulator 13, receiving vibration directly from the insulator 13, an auxiliary chamber 17 connected to the main chamber 111 via a small-diameter orifice 16 so as to cause the liquid to flow and separated from the main chamber 111 with a first partition plate 39, and an equilibrium chamber 19 formed between the main chamber 111 and the first partition plate 39 via a diaphragm 18, into which any one of a negative pressure and the atmospheric pressure is introduced. In this constitution, a second partition plate 44 serving also as a stopper is provided above a diaphragm 18 forming the equilibrium chamber 19 in the main chamber 111, and further, a second orifice 4 comprising a large-diameter orifice having a large opening area is provided in a portion of the second partition plate 44. In addition, any one of a negative pressure and the atmospheric pressure is continuously or alternately introduced into the equilibrium chamber 19. Switching means 25 conducting switching operation so as to alternately introduce the negative pressure and the atmospheric pressure into the equilibrium chamber 19 comprises a switching valve 31 comprising a three-way valve or the like, and a solenoid 32 for driving the switching valve 31. A throttle valve 29 as shown in FIG. 3 can be provided on the atmospheric pressure introducing port side of the switching valve 31 with a view to balancing the introducing rate of the atmospheric pressure with the introducing rate of the negative pressure into the equilibrium chamber 19. In this constitution, furthermore, control means 41 for controlling operation of the solenoid 32 of the switching means 25 is provided in a pressure control portion as encircled with a dush line in FIG. 3. This control means 41 is composed of a microcomputer comprising computing means mainly including a microprocessor unit (MPU).

Now, operations of the apparatus in this embodiment will be described below. First, as to idling vibration, a negative pressure and the atmospheric pressure are alternately introduced at a specific frequency into the equilibrium chamber 19 provided below the main chamber 111 by operating the switching means 25. More particularly, the pressure (volume) of the equilibrium chamber 19 is altered by ON/OFF-operating the switching means 25, thereby absorbing fluctuations of the liquid pressure in the main chamber 111 caused by idling vibration entered via the insulator 13. As a result, the dynamic spring constant of the spring system formed by the insulator 13 and the vibration isolating mechanism is reduced, thus permitting absorption and isolation of the idling vibration.

As to engine shake which is vibration of a further lower frequency than the idling vibration, the liquid is allowed to flow through an orifice (small-diameter orifice) connecting the main chamber 111 and the auxiliary chamber 17, thereby absorbing and isolating engine shake. Since engine shake vibration has a frequency of about 10 Hz, it is difficult to isolate vibration by reducing the dynamic spring constant. In this embodiment, therefore, a certain negative pressure is continuously introduced into the equilibrium chamber 19 forming the vibration isolating mechanism 14 to keep the volume of the equilibrium chamber 19 in null. This causes the liquid to flow through the small-diameter orifice 5 formed between the main chamber 111 and the auxiliary chamber 17 to obtain a prescribed damping force by means of the viscous drag resulting from this flow of the liquid. The engine shake is damped by this damping force.

As to vibration of a high frequency within a range of from 100 to 600 Hz which causes a dull sound posing a problem during travel of a vehicle, the equilibrium chamber 19 is brought into the state open to the open air by operating the switching means 25, whereby the inner volume of the equilibrium chamber 19 can freely vary relative to vibration of a frequency within the aforesaid range, entered via the liquid in the insulator 13 and the main chamber 111. As a result, the liquid in the main chamber 111 freely flows through the large-diameter orifice 4 of the second partition plate 44 provided in the main chamber 111, thus reducing the dynamic spring constant of the spring system formed by the vibration isolating mechanism. Isolation of high-frequency vibration is thus accomplished in response to the opening area of the orifice 4. In the apparatus of this embodiment, therefore, a plurality of kinds of vibration can be absorbed and isolated under the effect of the equilibrium chamber 19 having a varying inner volume by operating the switching means 25.

In the apparatus of this embodiment, furthermore, as shown in FIG. 3, a second partition plate 44 comprising a rigid body is provided above the diaphragm 18 forming the equilibrium chamber 19 in the main chamber 111. Under the effect of this second partition plate 44, therefore, when an entered vibration from the vibrating body has a large amplitude, a further downward stroke of the upper coupling member 6 brought about by the input of vibration from the vibrating body is arrested at the second partition plate. More specifically, the second partition plate 44 serves also as an inner stopper of the vibration isolating mechanism. Under the effect of this stopper function, the diaphragm 18 forming the equilibrium chamber 19 is protected upon input of vibration. As a result, the inner volume of the equilibrium chamber 19 normally varies, thereby ensuring reduction of the dynamic spring constant.

In this embodiment, the communication path 23 to the equilibrium chamber 19 may provide with a side branch or a resistance portion, and the atmospheric pressure duct line 36 may provide with an expansion chamber. Then, the expansion chamber may be used together with the side branch.

Figure 4:
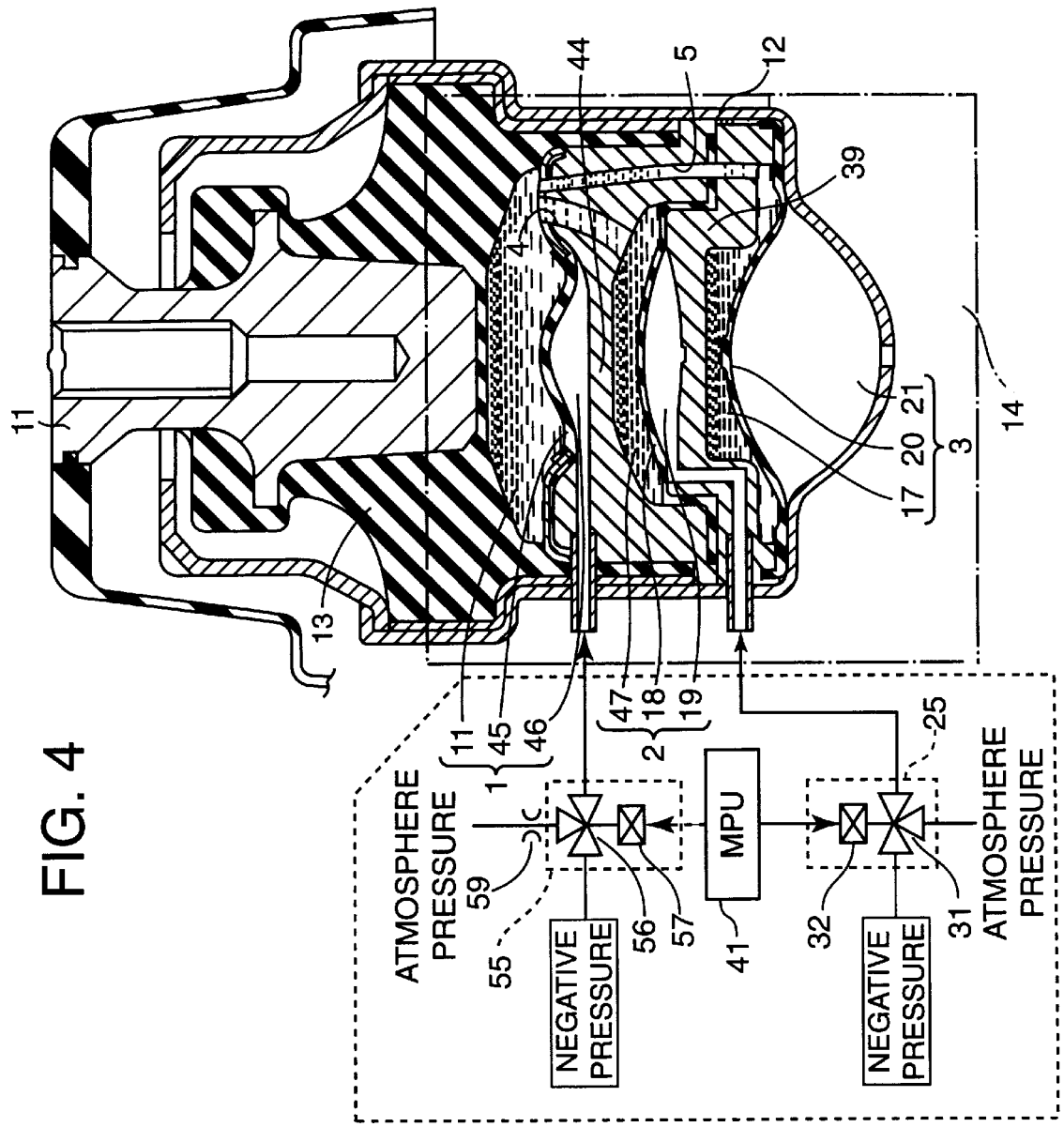
FIG. 4 is a longitudinal sectional view illustrating a whole configuration of a vibration isolating mechanism in accordance with further another embodiment of the present invention.
Figure 5:
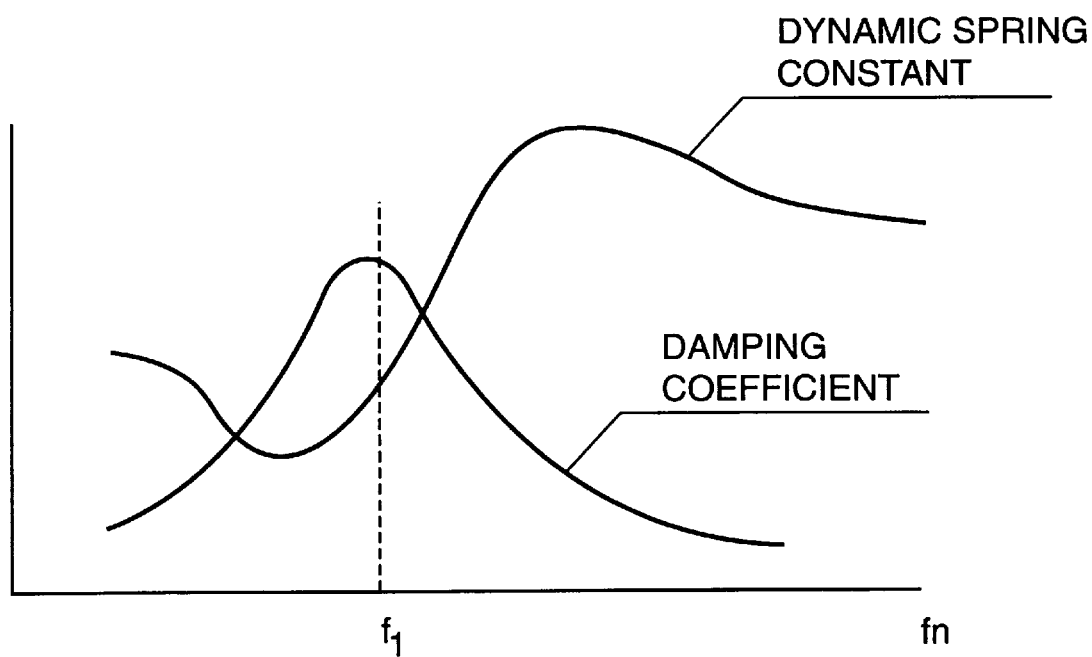
FIG. 5 is a graph showing changes in dynamic spring constant and damping coefficient formed by selecting a diameter and a length of an orifice.

Now, further another embodiment of the present invention will be described below with reference to FIGS. 4 and 5. The present embodiment differs from that described with reference to FIG. 3 in that three vibration isolating mechanisms are provided, and has a basic configuration, as shown in FIG. 4, comprising an upper coupling member 11 attached to a vibrating body, a lower coupling member 12 attached to a member or the like on the vehicle body side, an insulator 13 provided between the upper coupling member 11 and the lower coupling member 12 for absorbing and isolating vibration from the vibrating body, and vibration isolating mechanisms 1, 2 and 3 provided in series with the insulator 13 and formed by a liquid chamber sealing a liquid which is an incompressible fluid, and the like. In this basic configuration, the present embodiment is provided with three vibration isolating mechanisms. A first vibration isolating mechanism 1 comprises a first liquid chamber 11 formed below the insulator 13, into which vibration from the vibrating body is entered via the insulator 13, a first equilibrium chamber 46, formed below the first liquid chamber 11, into which a negative pressure and the atmospheric pressure are alternately introduced at a prescribed cycle (frequency), and an elastic film-shaped diaphragm 45 partitioning the first liquid chamber 11 and the first equilibrium chamber 46. A second vibration isolating mechanism 2 provided below the first vibration isolating mechanism 1 comprises a second liquid chamber 47 connected to the first liquid chamber 11 of the first vibration isolating mechanism 1 via a large-diameter orifice 4, a second equilibrium chamber 19, provided below the second liquid chamber 47, into which a negative pressure or the atmospheric pressure is continuously introduced, and a diaphragm 18 partitioning the second liquid chamber 47 and the second equilibrium chamber 19. A third vibration isolating mechanism 3 comprises a third liquid chamber 17 connected to the first liquid chamber 11 provided in the first vibration isolating mechanism 1 via a small-diameter orifice 5, a third equilibrium chamber 21, provided below the third liquid chamber 17, comprising an air chamber always receiving the introduced atmospheric pressure, and a film-shaped diaphragm 20 partitioning the third liquid chamber 17 and the third equilibrium chamber (air chamber) 21.

In this constitution, the individual vibration isolating mechanisms 1, 2 and 3 are separated by partition members 44 and 39 as shown in FIG. 4, integrally gathered with the insulator 13 and the like, and arranged between the upper coupling member 11 and the lower coupling member 12 to form a liquid-sealing type vibration isolating apparatus. In this configuration, a negative pressure or the atmospheric pressure is introduced through a first switching means 55 into the first equilibrium chamber 46 of the first vibration isolating mechanism 1. In the pressure control portion as encircled with a dush line in FIG. 4. The first switching means 55 comprises a switching valve 56 comprising a three-way valve or the like and a solenoid 57 operating the switching valve 56. The solenoid 57 controls the switching operation by means of control means 41 comprising a microcomputer mainly consisting of computing means such as a microprocessor unit (MPU). The solenoid 57 is thus driven on the basis of a control signal from the control means 41. An ON/OFF operation of the switching valve 56 maintains the first equilibrium chamber 46 in any of a certain negative pressure state or the atmospheric pressure (open to the open air) state, or causes alternate introduction of the negative pressure and the atmospheric pressure at a prescribed cycle (frequency). When the negative pressure and the atmospheric pressure are alternately introduced, a throttle valve 59 as shown in FIG. 1 is provided on the atmospheric pressure introducing port side of the switching valve 56 for balancing the introducing rate of the atmospheric pressure and the introducing rate of the negative pressure into the first equilibrium chamber 46.

A negative pressure or the atmospheric pressure is appropriately introduced through the second switching means 25 at the second equilibrium chamber 19 of the second vibration isolating mechanism 2. The second switching means 25 comprises a switching valve 31 comprising a three-way valve or the like and a solenoid 32 for operating the switching valve 31. The solenoid 32 controls the switching operation by means of the control means 41 comprising a microcomputer mainly consisting of computing means such as a microprocessor unit (MPU). Therefore, the second switching means 25 performs a switching operation on the basis of the control operation of the control means 41, and the second equilibrium chamber 19 is thus kept in a prescribed negative pressure state or the atmospheric pressure state.

Now, operations of the apparatus in the present embodiment comprising the constitution as described above will be described below. First, the vibration isolating operation against engine idling vibration is as follows. Covered frequencies in this case range from about 20 to 40 Hz. A negative pressure is therefore introduced through the second switching means 25 into the second equilibrium chamber 19 in FIG. 4 to bring the volume of the second equilibrium chamber 19 to null. That is, the operation of the diaphragm 18 in the second vibration isolating mechanism is prevented. In this state, the negative pressure and the atmospheric pressure are alternately introduced at a prescribed cycle (frequency) into the first equilibrium chamber 46 of the first vibration isolating mechanism 1. As a result, the liquid in the first liquid chamber 11 provided below the insulator 13 tends to flow toward the third liquid chamber 17 through the small-diameter orifice 5. However, because the diaphragm 45 forming the first equilibrium chamber 46 is vibrated at a frequency higher than the resonance frequency of the liquid present in the small-diameter orifice 5, and this causes fluctuations of volume of the first equilibrium chamber 46, the liquid in the first liquid chamber 11 cannot flow through the small-diameter orifice. As a result, the liquid pressure in the first liquid chamber 11 is caused to largely vary, and the liquid in the first liquid chamber 11 vibrates in phase state in which the increase in the liquid pressure in the first liquid chamber 11 caused by input vibration is canceled. The dynamic spring constant formed in the first vibration isolating mechanism 1 and the like is thus reduced.

As to engine shake which is vibration of a frequency further lower than the idling vibration described above, produced during travel of the vehicle, a negative pressure is introduced into the first equilibrium chamber 46 to bring the volume of the first equilibrium chamber 46 to null. That is, the diaphragm 45 in the first vibration isolating mechanism 1 is kept inoperable. When vibration is transmitted from the vibrating body such as an engine to the upper coupling member 11 in this state, the liquid pressure in the first liquid chamber 11 increases, and the liquid in the first liquid chamber 11 flows through the large-diameter orifice 4 into the second liquid chamber 47 of the second vibration isolating mechanism 2. A high damping property is available from the flow of the liquid in the first liquid chamber 11 through the large-diameter orifice 4. Vibration associated with engine shake having a frequency of about 10 Hz is consequently inhibited. By making the small-diameter orifice 5 capable of coping with vibration of a lower frequency under 5 Hz than engine shake, it is possible to inhibit such large-amplitude vibration as vibration upon engine cranking with a low frequency and a large amplitude, and vibration of a large amplitude produced upon sudden start or sudden acceleration, under the effect of the small-diameter orifice 5. The small-diameter orifice 5 causes the liquid in the first liquid chamber 11 toward the third liquid chamber 17 upon input of an initial load during installation on the vibrating body, to take balance of the inner pressure in these liquid chambers 11 and 17.

With regard to vibration within a high frequency region of from 100 to 600 Hz, which poses a problem of a dull sound in the vehicle room, the first equilibrium chamber 46 in the first vibration isolating mechanism in FIG. 4 is brought into the state open to the open air. At the same time, a negative pressure is continuously introduced into the second equilibrium chamber 19 forming the second vibration isolating mechanism 2 to bring the second equilibrium chamber 19 into the zero-volume state. The vibration transmitted through the upper coupling member 6 into the first liquid chamber 11 consequently vibrates the liquid in the first liquid chamber 11. Since the first equilibrium chamber 46 forming the first vibration isolating mechanism 1 is in the state open to the open air, the diaphragm 45 provided therein can freely vibrate. As a result, increase in the liquid pressure in the first liquid chamber 11 can be avoided against the entered vibration of a frequency within the high frequency region, and the dynamic spring constant is reduced for the entire vibration isolating apparatus. It is thus possible to isolate vibration within the high-frequency region which causes a dull sound.

According to the present embodiment, as described above, it is possible to obtain a low dynamic constant over a wide range of frequencies ranging from vibration within the low-frequency region mainly including idling vibration to vibration within the high-frequency region covering a dull sound by keeping the first equilibrium chamber 46 and the second equilibrium chamber 19 independently in a negative pressure state or in the atmospheric pressure state, or alternately introducing a negative pressure or the atmospheric pressure at a specific cycle (frequency) into the first equilibrium chamber. By the reduction of the dynamic spring constant, idling vibration and vibration associated with dull sound can be isolated. It is also possible to isolate (inhibit) engine shake which is a low-frequency vibration by obtaining a high damping property. The resonance action of the liquid present in the orifice 4 and the second liquid chamber 47 and the dynamic spring constant formed at the insulator 13 constituting the main spring can be caused to agree with a specific target frequency ($f_1$) as shown in FIG. 5 by bringing the first equilibrium chamber 46 in this state into the zero-volume state and appropriately setting the diameter and length of the large-diameter orifice 4. This permits isolation of vibration having the specific target frequency ($f_1$).

In this embodiment, the communication paths to each the equilibrium chambers may provide with a side branch or a resistance portion, and the atmospheric pressure duct line may provide with an expansion chamber. Then, the expansion chamber may be used together with the side branch.

Another embodiment of the present invention will now be described below with reference to FIG. 6. The basic constitution in this embodiment comprises, as shown in FIG. 6, an inner cylinder 77 forming a coupler attached to a vibrating body side, an outer cylinder 66, serving as a holder attached to the vehicle body side, to be attached to a bracket 12, an insulator 13 provided between the inner cylinder 77 and the outer cylinder 66 around the inner cylinder 77 connected to the vibrating body, a vibration isolating mechanism 14, provided around the insulator 13, and formed by a main chamber 15 and an auxiliary chamber 17 sealing a liquid which is an incompressible fluid, an equilibrium chamber 19, provided in the main chamber 15 of the vibration isolating mechanism 14, receiving a negative pressure or the atmospheric pressure, switching means 3 performing a switching operation of the negative pressure or the atmospheric pressure introduced into the equilibrium chamber 19, and control means 41 controlling the switching operation of the switching means 25.

In this basic constitution, the insulator 13 is made of a vibration-proof rubber material and integrally bonded to the inner cylinder through vulcanization adhering means. The vibration isolating mechanism 14 comprising the main chamber 15 and the like is provided around the insulator 13 of this configuration. As shown in FIG. 6, the vibration isolating mechanism 14 basically comprises the main chamber 15 following the insulator 13 and having a wall thereof formed by a part of the insulator 13, an auxiliary chamber 17 provided opposite to the main chamber 15 and separated by a ring-shaped partition plate 22, an orifice 16 connecting the main chamber 15 and the auxiliary chamber 17 and provided along the inside of the outer cylinder 66, an air chamber 21 provided via another diaphragm 20 outside the auxiliary chamber 17 and constantly receiving air, and an equilibrium chamber 19 formed via a diaphragm 18 in a space forming the main chamber 15.

In this basic constitution, the orifice 16 is provided between the main chamber 15 and the auxiliary chamber 17, and the liquid flows between the main chamber 15 and the auxiliary chamber 17. A stopper comprising a rubber-like elastic body is arranged in the main chamber 15, and a rigid protector 88 is provided below the stopper 8. When vibration of a large amplitude is entered from the vibrating body, the diaphragm 18 forming the equilibrium chamber 19 is protected by the stopper 8 and the protector 88. The insulator 13 comprising such a configuration and the vibration isolating mechanism 14 formed centering around the insulator 13 are installed in the outer cylinder 66, and the outer cylinder 66 is attached to a bracket 12 connected to a member or the like on the vehicle body side.

Figure 6:
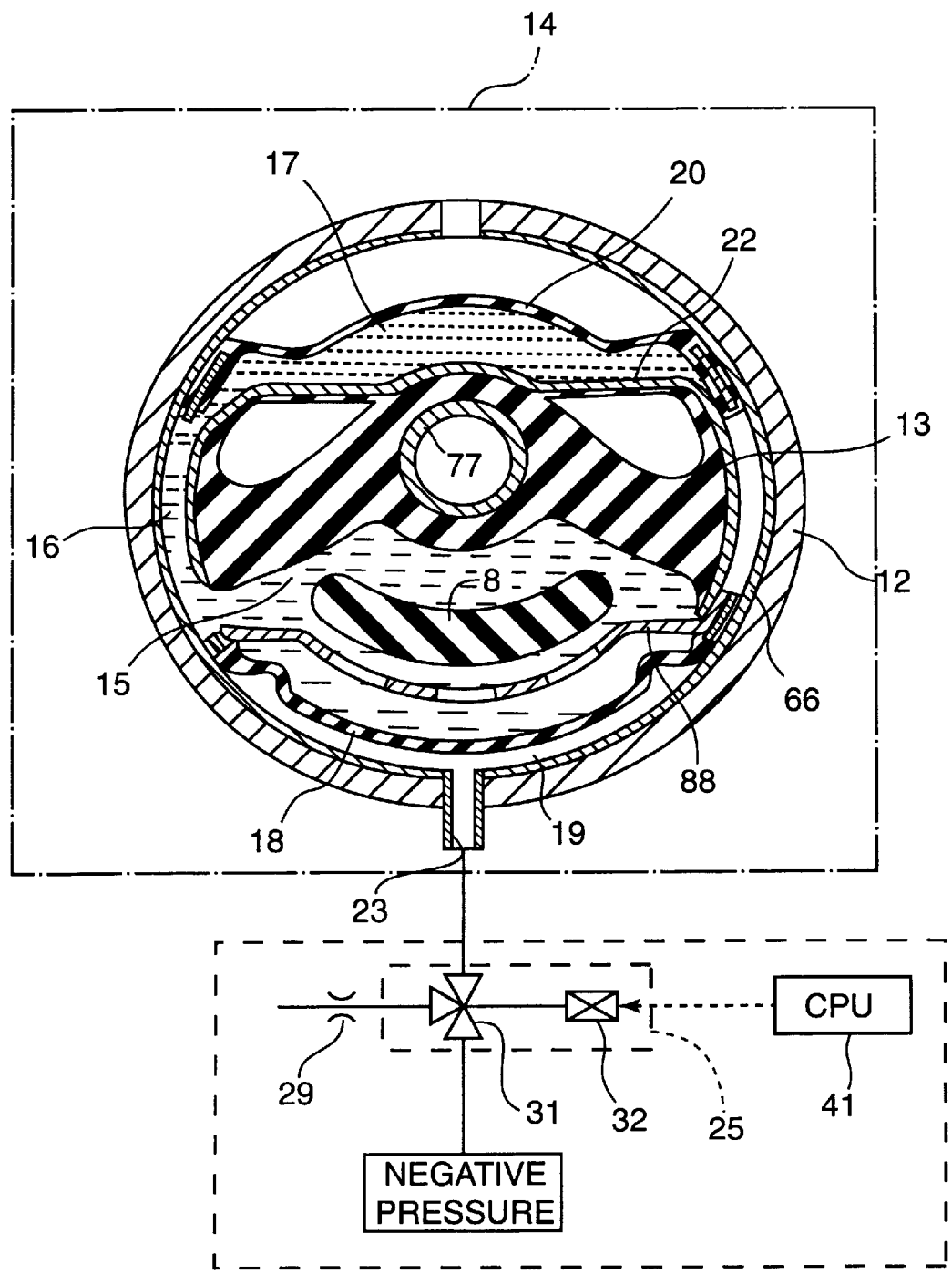
FIG. 6 is a sectional view illustrating a whole constitution of a cylindrical liquid-sealing type vibration isolating apparatus in accordance with another embodiment of the present invention.

In the pressure control portion as encircled with a dush line in FIG. 6, a communicating path 23 is provided at the equilibrium chamber 19 forming the vibration isolating mechanism 14 comprising the above configuration, and an end of this communicating path 23 is connected to a switching valve 31 forming switching means 25. The switching valve 31 comprises a three-way valve and causes the equilibrium chamber 19 to communicate with a negative pressure source or to the open air by appropriately switching over the vale. The switching operation of the switching means 25 is accomplished by an integrally provided solenoid 32. That is, the switching means 25 is formed by the solenoid valve. A throttle valve 29 for balancing the introducing rate of the atmospheric pressure and the introducing rate of the negative pressure is provided on the atmospheric pressure introducing port side of the switching valve 31 having the configuration described above.

The control means 41 controlling the switching operation of the switching means 25 comprises a microcomputer (CPU) formed on the basis of a microprocessor unit. The switching means 25 is driven by the control action of the control means 41 of this configuration, and this causes introduction of the negative pressure formed by a negative suction pressure of the engine or the atmospheric pressure formed by opening to the open air into the equilibrium chamber 19. Introduction of the negative pressure or the atmospheric pressure via the switching means 25 drives (deforms) the diaphragm 18 forming a portion of the equilibrium chamber 19, and absorbs fluctuations of the liquid pressure generated in the main chamber 15.

Now, operations of the apparatus of this embodiment having the constitution described above will be described below. As shown in FIG. 6, vibration from the vibrating body side is transmitted via the inner cylinder 66 to the insulator 13 comprising a rubber material. As a result, the insulator 13 vibrates or deforms, thus absorbing or isolating most of the entered vibration. Therefore, most of the vibration is isolated at the insulator 13, while a portion of vibration is not isolated at the insulator 13, but is isolated at the following vibration isolating mechanism 14. Now, detailed operations in the vibration isolating mechanism 14 will be described below. First, as to idling vibration, a negative pressure and the atmospheric pressure are alternately introduced at a specific frequency into the equilibrium chamber 19 provided in the main chamber 15 in the lower part thereof by operating the switching means 25. In other words, the pressure (volume) in the equilibrium chamber 19 is altered by operating the switching means 25 at a specific frequency, thereby absorbing fluctuations of the liquid pressure in the main chamber 15 caused by idling vibration entered via the insulator 13. As a result, the dynamic spring constant of the spring system formed by the insulator 13 and the vibration isolating mechanism 14 is reduced, thus accomplishing absorption and isolation of idling vibration.

As to engine shake which is vibration of a frequency of about 10 Hz, lower than that of idling vibration, it is difficult to isolate vibration by reducing the dynamic spring constant. In the present embodiment, therefore, vibration associated with engine shake is inhibited (damped) by improving damping property in the vibration isolating mechanism 14. That is, a certain negative pressure is introduced into the equilibrium chamber 19 forming the vibration isolating mechanism 14 to bring the volume in the equilibrium chamber 19 to null. As a result, the liquid flows through the orifice 16 formed between the main chamber 15 and the auxiliary chamber 17, thereby producing a certain damping force under the effect of viscous drag resulting from the flow of the liquid. This damping force permits damping of engine shake.

Regarding vibration of a high frequency within a range of from about 100 to 600 Hz, which causes a dull sound, a problem during travel of the vehicle, on the other hand, the switching means 25 is operated to maintain the equilibrium chamber 19 in the state open to the open air. The inner volume of the equilibrium chamber 19 can thus freely change in response to the vibration of the high frequency entered via the liquid in the insulator 13 and the main chamber 15. As a result, the liquid in the insulator 13 and the main chamber 15 can freely vibrate, and it is possible to inhibit the dynamic spring constant of the spring system formed by the vibration isolating mechanism 14 to a low level, thus improving the isolating effect relative to high-frequency vibration.

In further another embodiment of the present invention, the surface structure at the particular plate forming the equilibrium chamber may be modified (variation). The partition plate has fine irregularities on the surface so as to permit flow of air. These fine irregularities are formed by surface-treating the surface to roughen the same by the application of shot blasting means or craping means. A smooth layer is formed by applying a urethane-based paint or a silicone-based paint on the contact side of the diaphragm in contact with the surface of the partition plate.

By adopting the constitution mentioned above, when a negative pressure or the atmospheric pressure is introduced, and the vibrating diaphragm comes into contact with the partition plate, the partition plate and the diaphragm never come into close contact. More specifically, innumerable microspically fine irregularities are provided on the surface of the partition plate in contact with the diaphragm, and continuous grooves are formed between these fine irregularities. Therefore, even when the diaphragm is attracted by a negative pressure and comes into contact with the surface of the partition plate having these fine irregularities, many gaps are formed between them. The grooves formed by these gaps communicate with spaces other than those in which the diaphragm is present. The diaphragm therefore never comes into close contact with, or is never attracted by, the surface of the partition plate. As a result, the diaphragm smoothly operates (deforms) in response to introduction of the negative pressure or the atmospheric pressure from the switching means, thus permitting smooth progress of the change in the volume of the equilibrium chamber formed by the diaphragm.

In this embodiment, the atmospheric pressure duct line 51 may provide with an expansion chamber, and the communication path 23 may provide with a side branch or a resistance portion. Then, the expansion chamber may be used together with the side branch.

Figure 13:
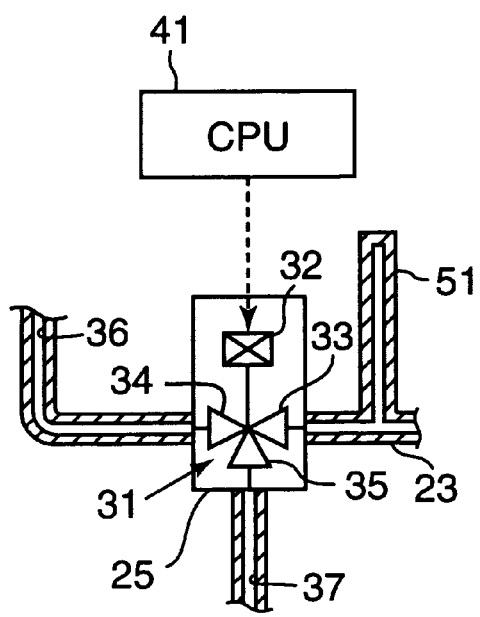
FIG. 13 is a partially enlarged sectional view of a pressure control portion provided in the apparatus of FIG. 7.

Another embodiment of the present invention shown in FIG. 7 will now be described below. Because the present embodiment has the same basic constitution as the embodiment of FIG. 1, only the features as shown in FIG. 13 will be described. In a pressure control portion of this embodiment as encircled with a dush line in FIG. 7, a side branch 51 constituting a housing space is provided in the middle of the communicating path 23 communicating between the first port 33 of the VSV 31 of the switching means 25. The side branch 51 is formed in a tubular shape (the diameter should preferably be over 2 mm) so as to branch from the communicating path 23 and has a closed tip end. In this embodiment, the length L of the side branch 51 is set so as to satisfy the following formula:

$$0.85 \, c/4f' \leq L \leq 1.15 \, c/4f'$$

where, c is the sound velocity [340 m/sec] and f' is the frequency [Hz] corresponding to the harmonic component in the required frequency (for example, an idling frequency).

Figure 8:
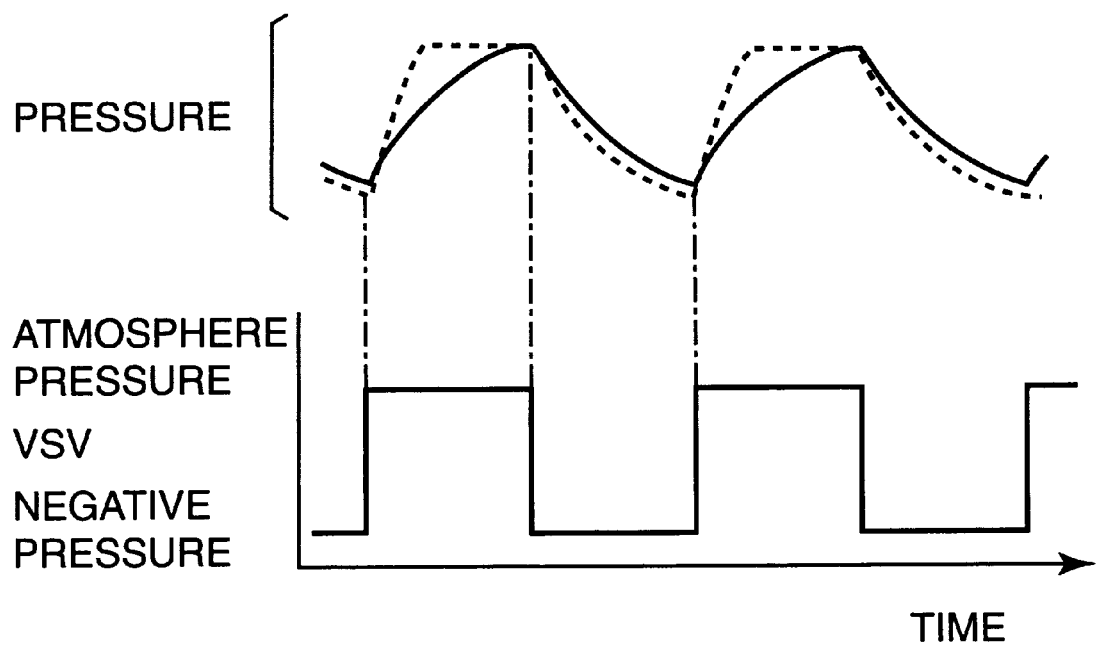
FIG. 8 is a timing chart illustrating the behavior or a VSV and pressure in an equilibrium chamber with the lapse of time in accordance with another embodiment of the present invention.

The functions and effects of the embodiment having the constitution described above will be described. Since the VSV 31 of the switching means 25 is switched over through switching operation, a harmonic component may result from switching. In this embodiment, in contrast, the side branch 51 is provided in the communicating path 23. Pulsation can therefore be produced in the atmospheric pressure and a negative pressure introduced from an atmospheric pressure duct line 36 and a negative pressure duct line 37. As shown in FIG. 8, the resonance effect of the pulsation adjusts the pressure waveform, thus resulting in elimination of the unnecessary harmonic component. Presence of the side branch slows down the increasing and decreasing rates of pressure in the equilibrium chamber 19. Fluctuations of pressure in the equilibrium chamber 19 therefore exhibit a smooth behavior as a sine wave, thereby permitting control of fluctuations of pressure of the liquid in the main liquid chamber 15 in response to vibration of the engine 1. As a result, the driver of the vehicle can more certainly inhibit propagation of vibration from the engine into the vehicle room by means of the vibration isolating apparatus described above.

According to the present embodiment, it is possible to eliminate the harmonic component from the produced pulsation by setting a length L of the side branch 51 so as to satisfy the foregoing formula, thus ensuring more certain achievement of the effects described above.

According to this embodiment, furthermore, the invention is applicable to a case where an engine 1 mounted on a vehicle body is the vibrating body. It is possible to effectively control and absorb vibration produced in the engine 1.

In this embodiment, a negative pressure source based on a negative pressure produced in the downstream of a throttle valve 7 provided in the middle of an intake path 6 of the engine 1 is employed. It is therefore possible to utilize an ordinary suction system of the engine 1, thus eliminating the necessity of a separate negative pressure source. As a result, increase in the cost can be inhibited.

In addition, according to this embodiment, the required frequency f should be in synchronization with the idling vibration of the engine 1. It is therefore possible to effectively control and absorb particularly idling vibration of the engine 1.

In this embodiment, as in the embodiment of FIG. 1, the atmospheric pressure duct line 36 may provide with an expansion chamber, and the communication path 23 as in the embodiment of FIG. 9 may provide with a resistant portion. Then, the expansion chamber may be used together with the side branch 51.

Now, further another embodiment of the present invention will be described below. Because the basic constitution of this embodiment is the same as that of the above-mentioned embodiment of FIG. 7, the same reference numerals are assigned to the corresponding members and the description is omitted here. The following description will therefore center around the differences from the second embodiment.

In this embodiment, as shown in FIG. 9, a foaming body 52 is provided as a resistance having permeability in the middle of the communicating path 23 in place of the foregoing side branch 51.

This embodiment basically provides the same effects as those of the other embodiments shown above. Presence of the foaming body 52 provided in the middle of the communicating path 23 communicating between the VSV 31 and the equilibrium chamber 19 slows down the increasing and decreasing rates of pressure in the equilibrium chamber 19. Fluctuations of pressure in the equilibrium chamber 19 exhibits a smoother behavior like a sine wave, thus permitting control of pressure fluctuations of the liquid in the main liquid chamber 15 in response to the engine 1 vibration, thus ensuring the same effects as those of the preceding embodiments.

Figure 10:
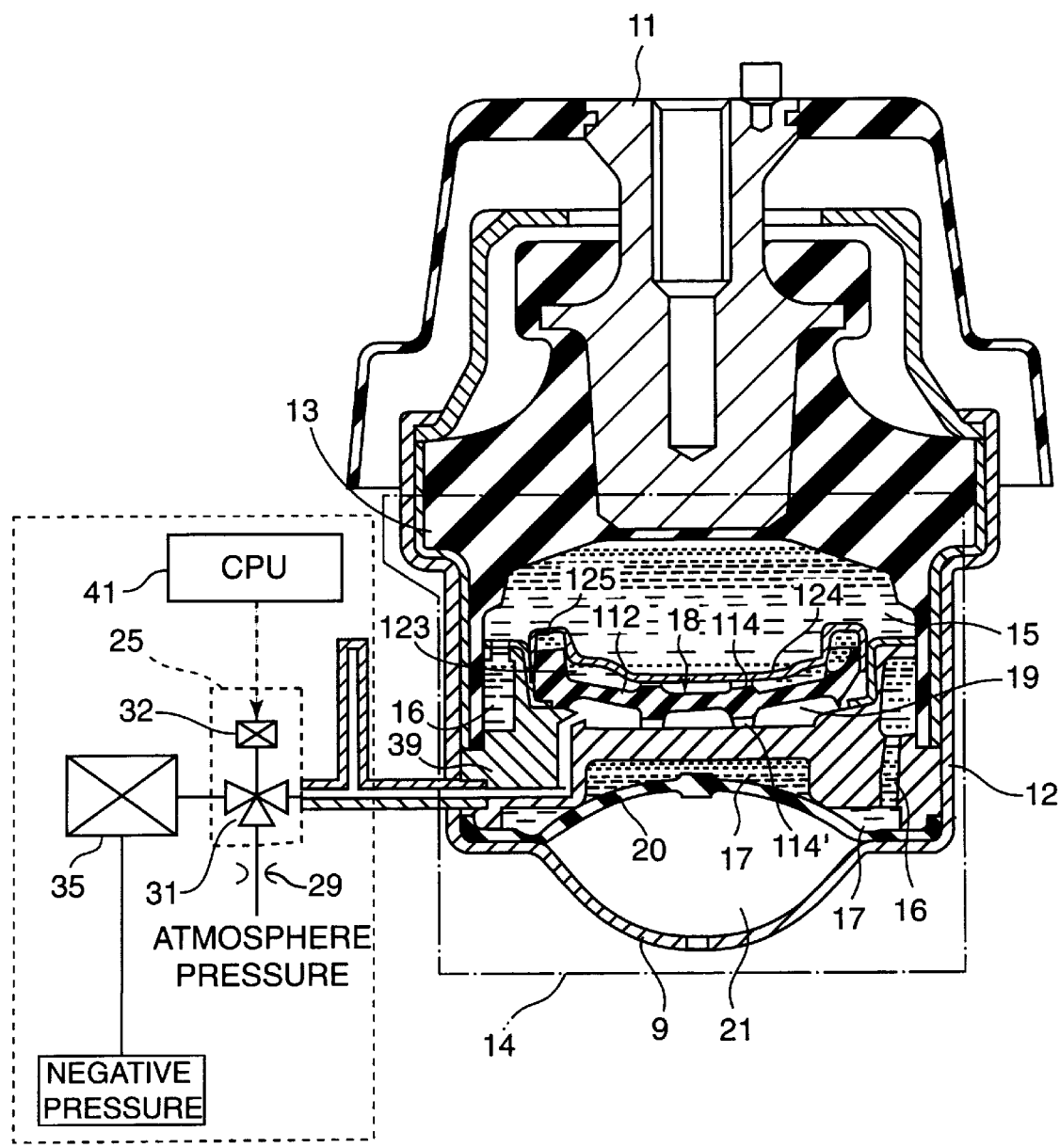
FIG. 10 is a longitudinal sectional view illustrating a liquid-sealing type vibration isolating apparatus in accordance with another embodiment of the present invention.

As further another embodiment of the present invention, a variation shown in FIG. 10 is conceivable in addition to the above. In this embodiment, a second diaphragm 18 has stopper-like projections 114 and 114' on the upper and lower sides near the center of the second diaphragm 18 with a view to improving the deformation rigidity (spring constant) of the second diaphragm 18. The tip end of the upper one (114) from among the upper and lower projection 114 and 114' comes into contact with a partition plate 124 separating the main chamber 15 from the third liquid chamber 123. The tip end of the lower one (114') comes into contact with a partition plate 39 forming the lower surface of the equilibrium chamber 19 as communicates with a pressure control portion as shown with a dash line.

A practical operation in this vibration isolating mechanism 14 is hereinafter described. First, the switching means 25 is operated with respect to the idling vibration to alternatively introduce a negative pressure or an atmosphere pressure with a specific frequency into the equilibrium chamber 19. That is, by operating the switching means 25 with the specific frequency, the pressure (volume) in the equilibrium chamber 19 is changed, thereby absorbing a fluctuation of liquid pressure through the third liquid chamber 123 and the second orifice 125, in which the fluctuation of liquid pressure in the main chamber 15 is generated by the idling vibration input through the insulator 13. As a result, a moving spring constant of the spring system is provided by the insulator 13 and the vibration isolating mechanism 14 is deteriorated.

Figure 14:
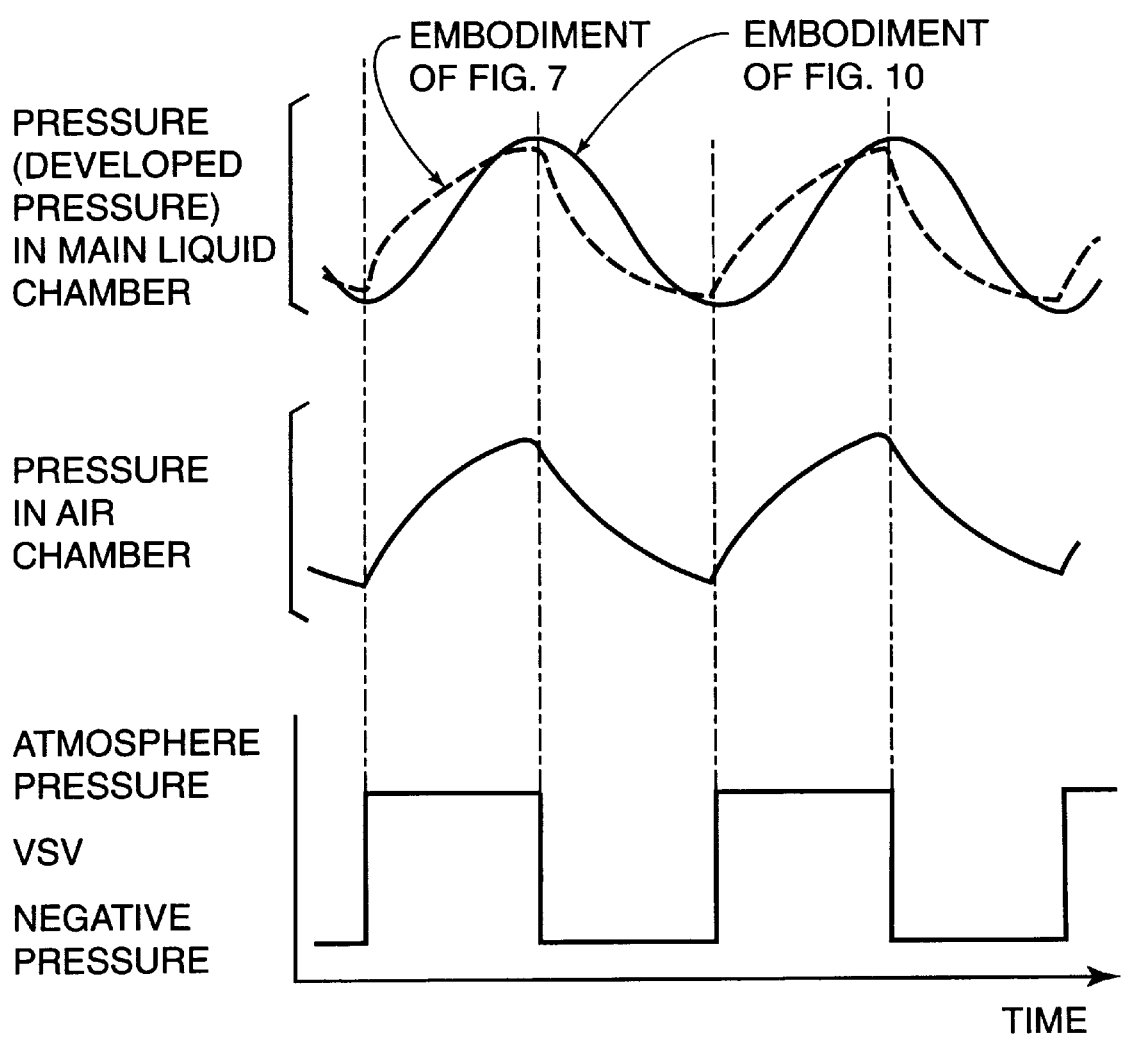
FIG. 14 is a timing chart illustrating the behavior of a VSV and pressure in an equilibrium chamber and an air chamber with respect to the lapse of time in accordance with an embodiment of the present invention.

In this case, according to the present embodiment, there is provided a third chamber connected to the main chamber 15 through the second orifice 125 having a predetermined volume, wherein the volume changes according to the change of the liquid pressure of the liquid in the main chamber, so that the second diaphragm 18 operates with the operation of the equilibrium chamber 19. This operation (vibration) through the third liquid chamber 123 and the second orifice 125 is propagated to the liquid in the main chamber 15. At this time, the liquid in the second orifice connecting the third liquid chamber 123 and the main chamber 15 to each other causes a resonance with the changes in the volume in the equilibrium chamber 19. This results in a developed force (a vibration energy) generated in the whole vibration isolating mechanism 14 which is provided by a normal sine wave as shown in FIG. 14, and the developed force thereof becomes a larger value than that of the embodiment of FIG. 7. This enables the absorption or isolation of the idling vibration to be more correctly performed.

Also, as to a vibration (noise) of a high frequency wave component which is likely to be caused in accordance with the isolation of the idling vibration, the generation thereof is prevented by the resonance operation of liquid in the second orifice 125. Furthermore, in the present embodiment, the volume of the second orifice 125 connecting the main chamber 15 and the third liquid chamber 123 to each other forms the second orifice 125 and may be adjusted by changing the diameter or length thereof. As a result, in case the engine idling vibration fluctuates by the operation of various kinds of attachments, at any time, it is made possible to correspond to it. That is, when a number of rotations of an engine is made idle-up (or the like) by the operation of the attachments (or the like), the length (or the like) of the second orifice 125 is changed in accordance with the number of vibrations as made idle-up, thereby enabling the volume thereof to be changed. It results that as to the idling vibrations in the state of idling-up, the isolation of the idling vibrations can be designed with a high efficiency.

As a result, upon introduction of a negative pressure or the atmospheric pressure into the equilibrium chamber 19 through the communication path 23 provide with the side branch to cope with idling vibration, the second diaphragm 18 deforms, i.e., vibrates by deformation of the projections 114 and 114', or by deformation (displacement) of the flat portion 112 not having the projections 114 and 114'. To cope with engine shake, on the other hand, the stopper-like projections 114 and 114' prevent deformation (displacement) of the entire diaphragm 18, and consequently, the spring constant (deformation rigidity) of the second diaphragm shows a higher value than that of a first diaphragm 20 provided on the auxiliary chamber 17 side. That is, the liquid in the main chamber 15 flows through the first orifice 16 toward the auxiliary chamber 17. As means to improve the deformation rigidity (spring constant) of the second diaphragm 18, there is conceivable a variation of configuration having a spring 115 having a prescribed spring constant, provided below the second diaphragm 18, i.e., on the equilibrium chamber 19 side, and always operating so as to push back the second diaphragm 18 toward the third liquid chamber 123 (see FIG. 11).

In the case of engine shake which is vibration of a frequency lower than that of the above-mentioned idling vibration, the liquid is caused to flow through the first orifice 16 connecting the main chamber 15 and the auxiliary chamber 17, thereby absorbing and isolating engine shake. In this embodiment, more particularly, as shown in FIG. 10, a constant negative pressure is continuously introduced into the equilibrium chamber 19 providing the vibration isolating mechanism 14, and the second diaphragm 18 providing the equilibrium chamber 19 is pulled downwardly, so that the volume of the equilibrium chamber 19 is made zero. This results in the equilibrium chamber 19 not causing the change of the volume thereof. In such a state, the vibration from the vibration generating body is propagated to the insulator 13, so that the bottom surface portion of the insulator 13 is vibrated according to this vibration and operated so as to direct and flow the liquid in the main chamber 15 positively to the auxiliary chamber 17. This results in the liquid in the main chamber 15 flowing to the auxiliary chamber 17 through the first orifice 16. The viscosity resistance accompanying this liquid flow generates a predetermined damping force, so that this damping force restrains (dampens) the above engine shake. In this embodiment, especially, the switching means 25 is first operated to bring the equilibrium chamber 19 into the state open to the open air, thus permitting free vibration of the second diaphragm 18 provided at the equilibrium chamber 19. When engine shake is entered into the main chamber in this state, fluctuations of pressure of the liquid in the main chamber 15 propagate through the second orifice 125 and the third liquid chamber 123 to the second diaphragm 18. However, because the second diaphragm 18 has the stopper-like projections 114 and 114' near the center as shown in FIG. 10, and the upper and lower tip ends of these projections 114 and 114' are always in contact with the partition plate 124 between the main chamber 15 and the third liquid chamber 123 and with the partition plate 39 forming the lower surface of the equilibrium chamber 19, it is difficult for the second diaphragm 18 itself to deform (displace) in the vertical direction. As a result, the liquid in the main chamber 15 flows through the first orifice 16 having a large diameter toward the auxiliary chamber 17 having a wall thereof formed by the easily deformable first diaphragm 20. A high damping property (a high damping force) of this vibration isolating apparatus is available from the flow of the liquid to the first orifice 16, and this high damping force inhibits (damps) the foregoing engine shake. And, the constitution of this embodiment can prevent the generation of such wrong conditions that the vibration absorbing characteristic changes due to fatigue of the diaphragm, and the equilibrium chamber is lost due to adhesion phenomenon of the diaphragm to the wall thereof. While, in this embodiment, the diameter of the second orifice 125 has been set at a value smaller than the diameter of the first orifice 16, the orifice may have a larger diameter, depending upon the degree of rigidity of the second diaphragm 18 forming the equilibrium chamber 19. In other words, it suffices that these diameters take values such that, in the state open to the open air of the equilibrium chamber 19, the liquid flows preferentially toward the first orifice 16.

In this embodiment, the communication path 23 in the pressure control portion as encircled with dash line may provide with a resistance portion, and the atmospheric pressure duct line may provide with an expansion chamber. Then, the expansion chamber may be used with the side branch.

Now, another embodiment of the present invention will be described with reference to FIG. 11. This embodiment has the same basic constitution as the embodiment shown in FIG. 10. It is characterized in that there is provided a spring 115 serving to push back the second diaphragm 18 toward the main chamber 15 on the back of the second diaphragm 18. More specifically, as shown in FIG. 11, the vibration isolating mechanism 14 basically comprises a main chamber 15, provided below the insulator 13, sealing a liquid which is an incompressible fluid, an auxiliary chamber 17 connected to the first chamber 15 via a first orifice 16 having a large diameter, and partitioned by a soft first diaphragm 20, an air chamber 21, provided below the auxiliary chamber 17 via the first diaphragm 20, always receiving air, a third liquid chamber 123 provided below the first chamber 15 and partitioned by a plate 124, a second orifice 125, provided at the plate partitioning the third liquid chamber 123 and the main chamber 15, and comprising a plurality of openings, a second diaphragm 18, provided below the third liquid chamber 123, and partitioning from the third liquid chamber 123, and an equilibrium chamber 19 partitioned via the second diaphragm from the third liquid chamber 123.

In this basic constitution, the second diaphragm 18 partitioning the equilibrium chamber 19 and the third liquid chamber 123 is basically made of a rubber-film-like member, and has a disk-shaped reinforcing plate 118 for protecting this rubber film, provided on the back (lower side). The reinforcing plate 118 is formed by a rigid body such as a metallic plate. A spring 115 operating to push back (push up) the second diaphragm 18 always toward the third liquid chamber 123 is provided via the reinforcing plate 118, as shown in FIG. 11, at the reinforcing plate 118 of the second diaphragm 18 having the configuration described above. This spring 115 comprises a coil spring in most cases. The coil spring 115 is set so as to always push up the second diaphragm and eventually ensure the volume of the equilibrium chamber 19.

A plate 124 provided above the equilibrium chamber 19 and the second diaphragm 18 partitioning and forming a part of the equilibrium chamber 19 and between the main chamber 15 and the third liquid chamber 123 forms a rigid protector. This plate 124 serving also as a protector prevents the lower end 166 of the upper coupling member 11 from hitting (coming into contact with) the second diaphragm 18 partitioning and forming the third liquid chamber 123 and the equilibrium chamber 19 when large-amplitude vibration is entered into the upper coupling member 11 connected to the vibrating body and the insulator 13. That is, the plate 124 serves as a down stopper of this vibration isolating apparatus and also serves to protect the second diaphragm 18. A plurality of openings are provided at positions off this plate 124 having the aforesaid constitution, and forms the second orifice for causing the liquid in the main chamber 15 to flow into the third liquid chamber 123 with these plurality of openings.

Figure 11:
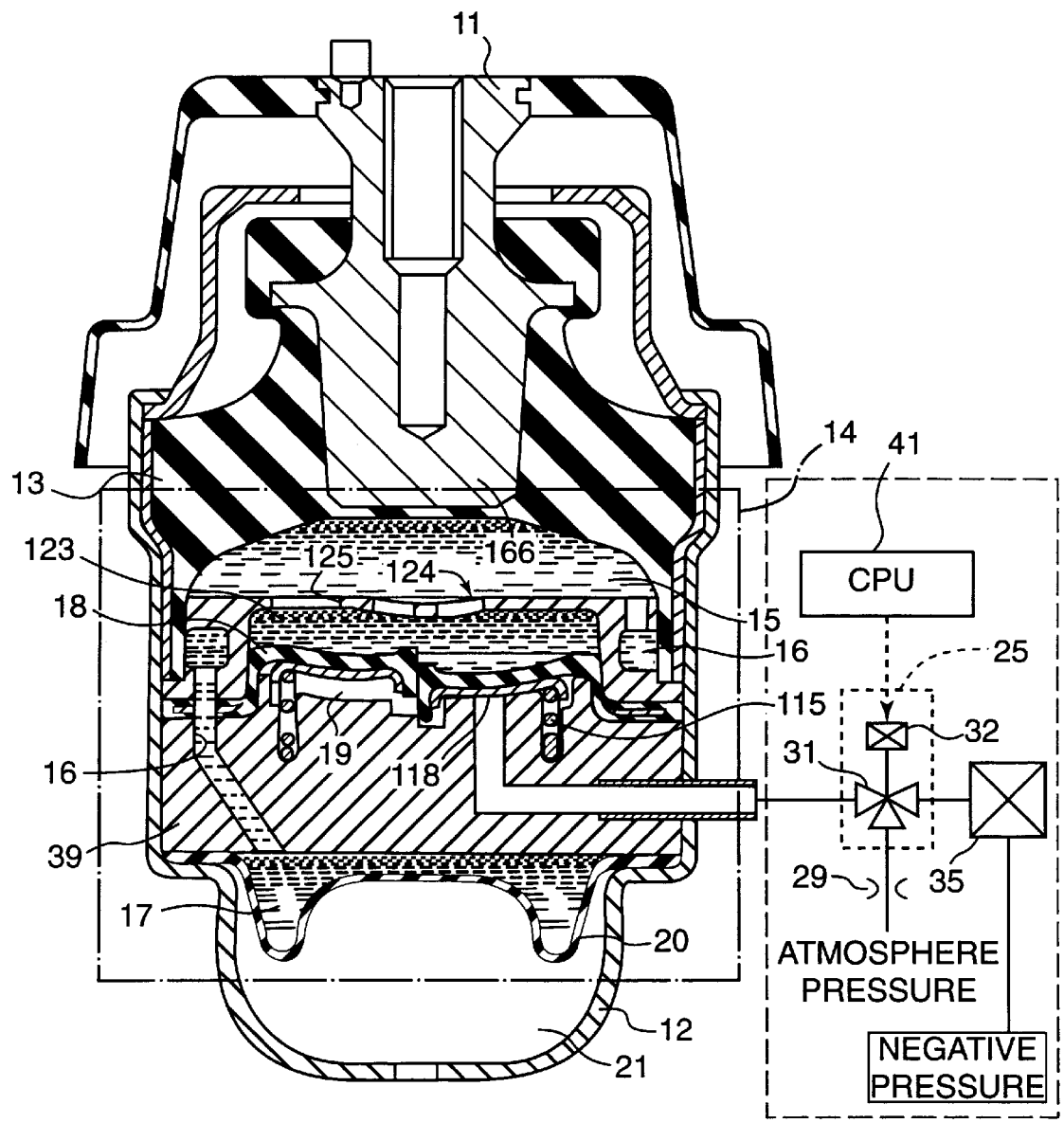
FIG. 11 is a longitudinal sectional view illustrating a liquid-sealing type vibration isolating apparatus in accordance with further another embodiment of the present invention.
Figure 12:
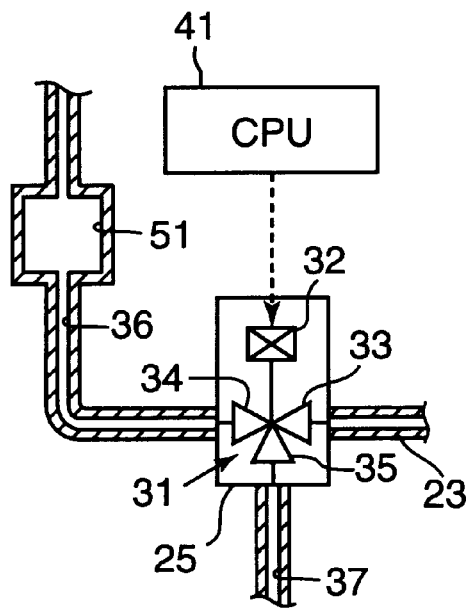
FIG. 12 is a partially enlarged sectional view of a pressure control portion provided in the apparatus of FIG. 1.

Switching means 25 operating to introduce a negative pressure or the atmospheric pressure in an appropriately switched state into the equilibrium chamber 19 having the constitution as described above comprises a switching valve 31 comprising a three-way valve or the like and a solenoid 32 driving the switching valve 31, as in the pressure control portion of the embodiment as encircled with a dush line in FIG. 11. Control means 41 for controlling a switching operation of this switching means 25 comprises a microcomputer (CPU) formed basically by computing means such as a microprocessor unit as in the first embodiment, and detects vibration from a vibrating body such as an engine to control a switching operation of the switching means in response to the vibration.

Now, operations of the apparatus of the embodiment having the constitution as described above will be described below. The constitution is basically the same as that shown in FIG. 10. This embodiment is characterized in that, regarding the second diaphragm 18 partitioning the third liquid chamber 123 and the equilibrium chamber 19, the constitution around the same comprises the rubber-film-like second diaphragm 18, and the spring 115 operating so as to push back the second diaphragm 18 always toward the third liquid diaphragm 123. More specifically, to cope with idling vibration, the switching means 25 is operated to alternately introduce an engine negative pressure and the atmospheric pressure into the equilibrium chamber 19, thereby causing the second diaphragm 18 to deform to resist to spring reaction of the spring 115 and vibrating the liquid in the third liquid chamber 123 to eventually cause an increase in the liquid pressure in the main chamber 15. As a result, the dynamic spring constant for the entire vibration isolating apparatus is reduced against idling vibration, thus permitting isolation of the idling vibration.

To cope with engine shake, fluctuations of liquid pressure in the main chamber 15 is transmitted to the third liquid chamber 123 via the second orifice containing the plurality of openings by bringing the equilibrium chamber 19 into the state open to the open air. However, because the second diaphragm 18 provided below the third liquid chamber 123 is always pushed up by the spring 115, the second diaphragm 18 does not displace (deform) under the effect of this spring reaction (resistance drag) of the spring 115. As a result, the liquid in the main chamber 15 flows through the first orifice 16 toward the auxiliary chamber 17 having a portion of wall thereof formed by the easily deformable first diaphragm 20. A high damping property is available from this flow of the liquid in the main chamber 15 into the first orifice 16, thus permitting eventual damping (inhibition) of engine shake.

Further, in the pressure control portion the atmospheric pressure duct line may provide with an expansion chamber, and the communication path may provide with a side branch or a resistance portion. Then, the expansion chamber may be used together with the side branch.

What is claimed is:

1. A liquid-sealing type vibration isolating apparatus comprising:

a coupler attached to a vibrating body;

a holder attached to a vehicle body side;

an insulator provided between said coupler and said holder that absorbs and isolates vibration from said vibrating body;

a vibration isolating mechanism which directly follows said insulator and is formed with a liquid chamber containing a liquid in the form of an incompressible fluid wherein said vibration isolating mechanism includes a main chamber having a wall formed by a part of the insulator and seals the liquid, wherein said main chamber is arranged in series with said insulator;

an auxiliary chamber connected to said main chamber via a first orifice, wherein said liquid flows through said first orifice, wherein said auxiliary chamber is separated from said main chamber by a first partition plate formed of a rigid body;

an equilibrium chamber divided from said main chamber via a first diaphragm which allows the volume in the equilibrium chamber to change, wherein said equilibrium chamber is formed between said main chamber and said first partition plate;

an air chamber divided from said auxiliary chamber via a second diaphragm and which constantly receives air, wherein said second diaphragm has a shape having a stopper-like projection which is in constant contact with the first partition plate forming the lower surface of said equilibrium chamber, and said second diaphragm has a higher deformation rigidity than said first diaphragm;

a switching mechanism which continuously introduces one of a negative pressure and atmospheric pressure into said equilibrium chamber in synchronization with engine vibration;

a control mechanism which controls the switching operation of said switching mechanism;

a third liquid chamber connected to said main chamber via a second orifice and formed between said main chamber and said first partition plate to receive the liquid in said main chamber; and a second partition plate serving as a stopper, provided in said main chamber above said equilibrium chamber wherein the second orifice is provided in a portion of said second partition plate.

* * * * *